(12) United States Patent
Benjamin et al.

(10) Patent No.: US 11,023,481 B2
(45) Date of Patent: Jun. 1, 2021

(54) NAVIGATION PLATFORM FOR PERFORMING SEARCH QUERIES

(71) Applicant: The Brane Inc., Montreal (CA)

(72) Inventors: Nicolas Benjamin, Montreal (CA); Mikaël Héroux-Vaillancourt, Montreal (CA); Micaiah James Nissen, De Witt, IA (US); Catherine Desrochers, Montreal (CA); Olivier Bonnaure, Salindres (FR); Pierre de Gourcy, Paris (FR); Andrey Ivanov, St-Bruno-de-Montarville (CA); Darwin Josue Medina, Tegucigalpa (HN); Juliano Rafael Silva Farias, Maringá (BR)

(73) Assignee: commos inc., Montréal (CA)

( * ) Notice: Subject to any disclaimer, the term of this patent is extended or adjusted under 35 U.S.C. 154(b) by 90 days.

(21) Appl. No.: 16/058,390

(22) Filed: Aug. 8, 2018

(65) Prior Publication Data

US 2020/0050695 A1    Feb. 13, 2020

(51) Int. Cl.
| | |
|---|---|
| G06F 16/248 | (2019.01) |
| G06F 9/451 | (2018.01) |
| G06F 16/28 | (2019.01) |
| G06F 16/9535 | (2019.01) |
| G06F 3/0484 | (2013.01) |
| G06F 3/0482 | (2013.01) |

(52) U.S. Cl.
CPC ............ G06F 16/248 (2019.01); G06F 9/451 (2018.02); G06F 16/288 (2019.01); G06F 16/9535 (2019.01); *G06F 3/0482* (2013.01); *G06F 3/04842* (2013.01)

(58) Field of Classification Search
CPC .............. G06F 16/9535; G06F 16/288; G06F 3/04842; G06F 9/451; G06F 16/248; G06F 3/0482; G06F 17/30
USPC ........................................................ 707/722
See application file for complete search history.

(56) References Cited

U.S. PATENT DOCUMENTS

| | | |
|---|---|---|
| 6,426,761 B1 | 7/2002 | Kanevsky et al. |
| 6,931,604 B2 | 8/2005 | Lane |
| (Continued) | | |

OTHER PUBLICATIONS

Jul. 30, 2015—1:01pm by Shayla McGhee: https://www.gpb.org/blogs/education-matters/2015/07/30/top-5-edtech-tips-instagrok.*

(Continued)

*Primary Examiner* — Hicham Skhoun
(74) *Attorney, Agent, or Firm* — Anglehart et al.

(57) ABSTRACT

A method performed on a client computing device for providing a graphical user interface for searching through topics and user profiles. It includes rendering, the graphical user interface comprising a first search node, associated with a first node data structure; receiving user input corresponding to a selection of one of the first plurality of nodes as a second search node; and node position input of the second search node; transmitting, a selection request corresponding to the node selection of one of the first plurality of nodes; receiving, data relating to a second plurality of node data structures associated with the second search node; generating on the graphical user interface the second search node at a location on the graphical user interface corresponding to the node position input; and a linking member connecting the first search node to the second search node.

18 Claims, 25 Drawing Sheets

(56) References Cited

U.S. PATENT DOCUMENTS

| | | | |
|---|---|---|---|
| 7,343,365 B2 | 3/2008 | Farnham et al. | |
| 7,720,857 B2 | 5/2010 | Beringer et al. | |
| 7,792,868 B2 | 9/2010 | Finkelstein et al. | |
| 7,953,738 B2 | 5/2011 | Chickering et al. | |
| 7,970,764 B1* | 6/2011 | Ershov | G06F 16/954 |
| | | | 707/736 |
| 8,126,926 B2 | 2/2012 | Atre et al. | |
| 9,779,147 B1* | 10/2017 | Sherman | G06F 16/2423 |
| 9,836,183 B1* | 12/2017 | Love | G06T 11/206 |
| 2002/0105552 A1* | 8/2002 | Lane | G06F 3/0482 |
| | | | 715/853 |
| 2003/0158855 A1* | 8/2003 | Farnham | G06Q 10/10 |
| 2004/0193587 A1* | 9/2004 | Yamashita | G06F 16/9038 |
| 2005/0114384 A1* | 5/2005 | Beringer | G06F 16/9038 |
| 2008/0091670 A1* | 4/2008 | Ismalon | G06F 16/3322 |
| 2008/0115083 A1* | 5/2008 | Finkelstein | G06F 16/954 |
| | | | 715/805 |
| 2008/0140655 A1 | 6/2008 | Hoos et al. | |
| 2008/0215416 A1 | 9/2008 | Ismalon | |
| 2009/0115785 A1* | 5/2009 | Grandhi | G06T 11/206 |
| | | | 345/440 |
| 2009/0158196 A1* | 6/2009 | Crystal | G06F 16/26 |
| | | | 715/780 |
| 2010/0161680 A1* | 6/2010 | Atre | G06F 16/248 |
| | | | 707/803 |
| 2012/0041903 A1* | 2/2012 | Beilby | H04L 51/02 |
| | | | 706/11 |
| 2013/0104088 A1* | 4/2013 | Santos-Gomez | G06F 16/904 |
| | | | 715/854 |
| 2013/0124542 A1* | 5/2013 | Lee | G06Q 50/01 |
| | | | 707/751 |
| 2013/0218899 A1* | 8/2013 | Raghavan | G06F 16/3328 |
| | | | 707/741 |
| 2016/0217424 A1* | 7/2016 | Challenger | G06Q 10/067 |
| 2017/0235766 A1* | 8/2017 | Mawji | G06F 16/24575 |
| | | | 707/722 |
| 2018/0182137 A1* | 6/2018 | Pushpoth | G06F 3/0482 |
| 2019/0005456 A1* | 1/2019 | Sawford | G06Q 10/06311 |
| 2019/0213284 A1* | 7/2019 | Anand | G06F 9/453 |
| 2020/0012722 A1* | 1/2020 | Geng | G06F 16/951 |

OTHER PUBLICATIONS

Nov. 13, 2013—Uploaded by Kirill Kireyev: https://www.youtube.com/watch?v=zDv3_mwyZPQ.*

Aug. 13, 2012—Uploaded by Kirill Kireyev: https://www.youtube.com/watch?v=OZK9alqt52k.*

Jan. 18, 2013—Uploaded by Kirill Kireyev: https://www.gettingsmart.com/2012/08/smart-searching-just-got-smarter-instagrok/.*

Jun. 28, 2016—Uploaded by All about teaching and learning!: https://www.youtube.com/watch?v=ihCDZoXULk4.*

NPL1: https://www.youtube.com/watch?v=9JJX6zqldAg How to use instagrok—YouTube instagrok is an educational search engine. This video is a quick tutorial of using the site. May 1, 2012—Uploaded by ASD TechTips.*

NPL2: https://www.sophia.org/tutorials/using-instagrok-as-a-research-tool In this tutorial, you will learn how to use InstGrok . Jan. 18, 2013—Uploaded by Kirill Kireyev.*

NPL3: https://www.youtube.com/watch?v=iBORHBVxmlc How to Use InstaGrok. InClassWith DrPrince. Jul. 10, 2012—Uploaded by InClassWith DrPrince.*

Instagrok; https://www.youtube.com/watch?v=9JJX6zqldAg ;https://www.youtube.com/watch?v=ihCDZoXULk4 ; https://www.youtube.com/watch?v=2vDm0uBmk9Y.

Invisque https://youtu.be/FDmswS6cceg.

* cited by examiner

=

C

=

∪

NAVIGATION PLATFORM FOR PERFORMING SEARCH QUERIES

TECHNICAL FIELD

The present application relates to search navigation platforms, and more particularly to navigation platforms for allowing a user to perform a search through topics.

BACKGROUND

Current search platforms, such as Firefox®, Google®, or search platforms for scientific publication databases, such as PubMed®, present the user with a toolbar, in which the search terms are entered. The search results are then presented in the form of a list, in some cases classified from the most to the least relevant, or as a function of other parameters, such as the newest or oldest entries. The user can then refine the search results by adding additional search terms, specifying certain parameters (based on date of appearance of the result; type of result or source; etc.) However, these search platforms do not allow the user to easily trace back the history of the search, having, in some cases, to resort to a "search history" page or window, where a list of web pages or search terms may be provided. However, this mechanism of providing a search history to the user does not allow the user to efficiently trace back the steps of the search, nor to easily take the search into a new direction.

Moreover, with respect to scientific literature, databases of scientific literature may contain publications from a certain scientific field, where other databases would contain publications from another field. However, this spreading of scientific publications across different databases makes it difficult to conduct a search that covers multiple fields. It is difficult to obtain an encompassing set of search results when the search topic is one that extends across multiple scientific fields. The user is left to conduct a search through each respective database, without any guarantee that the search will hone in on the majority of relevant results. Additionally, when conducting a search across a variety of databases that cover a plurality of separate topics, it would be advantageous to have a search system that is capable of compiling and presenting the search results in a way that can improve the accuracy of search results, facilitating the navigation thereof and the presentation of the information in a more intuitive and user-friendly manner.

SUMMARY

The present disclosure relates to a search and navigation platform implemented on a computer device for improving the carrying out of a search through topics.

The present platform is adapted to conduct a search through numerous databases. The databases, for instance, may be those that archive scientific publications from a diversity of scientific fields. Therefore, the platform allows a user to conduct a search through the plurality of databases, and to conduct a search that would touch upon or interlink more than one scientific field, while yielding the relevant results of the cross-industry or interdisciplinary search. It would be understood that the present platform may be used in other contexts than to conduct a search in scientific literature. For instance, the platform may be used for consumer shopping, where the databases may be instead online stores or even websites that already consolidate items that are for sale and offered by different online retailers, such as LYST®.

Additionally, the present platform offers an improved mechanism for organizing and presenting search results. The search results are organized under a series of topics, and the user conducts a search through these topics, where the topics are interconnected using a predicate, where two topics, with the predicate, form a subject-predicate-object semantic triple. The topics are visually represented as icons on the graphical user interface (i.e. nodes), where related nodes are shown in association with the node that has been selected by the user as being the focus of the search. The nodes can be selected to bring the user to a resource (e.g. a window, webpage or tab) that provides additional information on the topic that is associated with the selected node, using, e.g., an application program interface or a webhook. The selected resource may be itself a uniform resource identifier to one or a plurality of databases containing files or information on the topic of interest.

A broad aspect of the present disclosure is a method performed on a client computing device for providing a graphical user interface for searching through topics and user profiles. The method include rendering, by the client computing device on a display of the client computing device, the graphical user interface comprising a first search node, associated with a first node data structure, that identifies a first plurality of related nodes associated with the first search node, wherein each of the first plurality of nodes is respectively associated with one of a first plurality of node data structures, wherein at least one of the first plurality of node data structures contains information on a user profile, and wherein at least one of the first plurality of node data structures is related to a topic node data structure having compiled information on a specific topic. The method includes receiving, on the graphical user interface rendered on the display of the client computing device, user input corresponding to a selection of one of the first plurality of nodes as a second search node, and node position input of the second search node. The method includes transmitting, by the client computing device to one or more remote computers, a selection request corresponding to the node selection of one of the first plurality of nodes. The method includes receiving, at the client computing device, data relating to a second plurality of node data structures associated with the second search node. The method includes generating, by the client computing device on the display of the client computing device, on the graphical user interface the second search node corresponding to the selection of one of the first plurality of nodes at a location on the graphical user interface corresponding to the node position input, and a second plurality of nodes appearing on the graphical user interface in association with the second search node, wherein each node of the second plurality of nodes is associated with a node data structure of the second plurality of node data structures, and a linking member connecting the first search node to the second search node.

In some embodiments, the linking member may be associated with a linking member data structure that contains information on a predicate defining a causal or factual relationship between the first search node and the second search node, and information in support of the causal or factual relationship between the first search node and the second search node.

In some embodiments, the information in support of the causal relationship may include a score of trustworthiness of the causal relationship between the first search node and the second search node based on user input.

In some embodiments, the node position input is one of a selection made by a user of a position where the selection of one of the first plurality of nodes is to be positioned; and a selection of an option to automatically position the selection of one of the first plurality of nodes in space surrounding the first search node.

In some embodiments, the method may include receiving, on the graphical user interface rendered on the display of the client computing device, user input corresponding to a selection of one of the second plurality of nodes as a third search node; and node position input of the third search node; transmitting, by the client computing device to one or more remote computers, a selection request corresponding to the node selection of one of the second plurality of nodes; receiving, at the client computing device, data relating to a third plurality of node data structures associated with the third search node; and generating, by the client computing device on the display of the client computing device, on the graphical user interface the third search node corresponding to the selection of one of the second plurality of nodes at a location on the graphical user interface corresponding to the node position input, and a third plurality of nodes appearing on the graphical user interface in association with the third search node, wherein each node of the third plurality of nodes is associated with a node data structure of the third plurality of node data structures; and a linking member connecting the second search node to the third search node.

In some embodiments, the data relating to the second plurality of nodes may include an integer of a number of nodes in the second plurality of nodes, the identifier of each node data structure associated with each node of the second plurality of nodes, and a title for each node of the second plurality of nodes.

In some embodiments, the method may include rendering, on the graphical user interface generated by the client computing device on the display of the client computing device, a search bar configured to receive a string of keyboard entries inputted using a keyboard of the computing device; transmitting, by the client computing device to one or more remote computers, data in accordance with the string of keyboard entries; and receiving, at the client computing device, data on at least one initial node data structure that comprises compiled information on an initial topic that corresponds to the string of keyboard entries, wherein the first search node is associated with the initial node data structure.

In some embodiments, the linking member may include a visual component showing search directionality from the first search node to the second search node.

In some embodiments, the first search node may be associated to a topic node data structure providing information pertaining to an initial topic.

In some embodiments, the compiled information may include information relating to scientific publications.

Another broad aspect is a computer device, including a memory to store data and instructions, a processor in communication with the memory, a user input interface, and a display. The computer device also includes a search and navigation application program accessible via the memory and the processor, wherein the search and navigation application program is operable to: render, on the display, the graphical user interface comprising a first search node, associated with a first node data structure, that identifies a first plurality of related nodes associated with the first search node, wherein each of the first plurality of nodes is respectively associated with one of a first plurality of node data structures, wherein at least one of the first plurality of node data structures contains information on a user profile, and wherein at least one of the first plurality of node data structures is a topic node data structure having compiled information on a specific topic; receive, on the graphical user interface rendered on the display, user input inputted from the user input interface corresponding to a selection of one of the first plurality of nodes as a second search node, and node position input of the second search node; transmit, to one or more remote computers, a selection request corresponding to the node selection of one of the first plurality of nodes; receive data relating to a second plurality of node data structures associated with the second search node; generate, on the display of the client computing device, on the graphical user interface: the second search node corresponding to the selection of one of the first plurality of nodes at a location on the graphical user interface corresponding to the node position input, and a second plurality of nodes appearing on the graphical user interface in association with the second search node, wherein each node of the second plurality of nodes is associated with a node data structure of the second plurality of node data structures, and a linking member connecting the first search node to the second search node.

In some embodiments, the linking member may be associated with a linking member data structure that contains information on a predicate defining a causal or factual relationship between the first search node and the second search node, and information in support of the causal or factual relationship between the first search node and the second search node.

In some embodiments, the information in support of the causal relationship may include a score of trustworthiness of the causal relationship between the first search node and the second search node based on user input.

In some embodiments, the node position input may be one of a selection made by a user of a position where the selection of one of the first plurality of nodes is to be positioned; and a selection of an option to automatically position the selection of one of the first plurality of nodes in space surrounding the first search node.

In some embodiments, the search and navigation application program may be further operable to receive, on the graphical user interface rendered on the display, user input from the user input interface corresponding to: a selection of one of the second plurality of nodes as a third search node; and node position input of the third search node; transmit, to one or more remote computers, a selection request corresponding to the node selection of one of the second plurality of nodes; receive data relating to a third plurality of node data structures associated with the third search node; and generate, on the display of the client computing device, on the graphical user interface: the third search node corresponding to the selection of one of the second plurality of nodes at a location on the graphical user interface corresponding to the node position input, and a third plurality of nodes appearing on the graphical user interface in association with the third search node, wherein each node of the third plurality of nodes is associated with a node data structure of the third plurality of node data structures, and a linking member connecting the second search node to the third search node.

In some embodiments, the data relating to the second plurality of nodes may include an integer of a number of nodes in the second plurality of nodes, the identifier of each node data structure associated with each node of the second plurality of nodes, and a title for each node of the second plurality of nodes.

In some embodiments, the user input interface may include a keyboard, the search and navigation application program further may be operable to render, on the graphical user interface generated on the display, a search bar configured to receive a string of keyboard entries inputted using a keyboard of the computing device; transmit, to one or more remote computers, data in accordance with the string of keyboard entries; and receive, from the one or more remote computers, data on at least one initial node data structure that comprises compiled information on an initial topic that corresponds to the string of keyboard entries; wherein the first search node is associated with the initial node data structure.

In some embodiments, the linking member may include a visual component showing search directionality from the first search node to the second search node.

In some embodiments, the first search node may be associated to a topic node data structure providing information pertaining to the initial topic.

In some embodiments, the compiled information may include information relating to scientific publications.

Another broad aspect is a computer-readable medium storing instructions executable by a computer device. The medium includes at least one instruction for causing the computing device to render a graphical user interface comprising a first search node, associated with a first node data structure, that identifies a first plurality of related nodes associated with the first search node, wherein each of the first plurality of nodes is respectively associated with one of a first plurality of node data structures, wherein at least one of the first plurality of node data structures contains information on a user profile, and wherein at least one of the first plurality of node data structures is a topic node data structure having compiled information on a specific topic; at least one instruction for causing the computing device to be adapted to receive, on the graphical user interface rendered on the display of the client computing device, user input corresponding to: a selection of one of the first plurality of nodes as a second search node; and node position input of the second search node; at least one instruction for causing the computing device to transmit, by the client computing device to one or more remote computers, a selection request corresponding to the node selection of one of the first plurality of nodes; at least one instruction for causing the computing device to be adapted to receive, at the client computing device, data relating to a second plurality of node data structures associated with the second search node; at least one instruction for causing the computing device to generate, by the client computing device on the display of the client computing device, on the graphical user interface the second search node corresponding to the selection of one of the first plurality of nodes at a location on the graphical user interface corresponding to the node position input, and a second plurality of nodes appearing on the graphical user interface in association with the second search node, wherein each node of the second plurality of nodes is associated with a node data structure of the second plurality of node data structures; and a linking member connecting the first search node to the second search node.

Another broad aspect is a method performed on a client computing device for providing a graphical user interface for generating a path of nodes corresponding to a search sequence. The method includes rendering, by the client computing device on a display of the client computing device, the graphical user interface representable as a matrix of cells of equal dimensions, comprising a first search node appearing in a first cell of the matrix of cells, and a first plurality of nodes associated with the first search node. The method includes receiving, at the client computing device user node selection input corresponding to a selection of one of the first plurality of nodes, and first node position input corresponding to selecting a second cell of a first selection of cells that are adjacent to the first cell of the matrix of cells. The method includes generating, by the client computing device on the display of the client computing device, on the graphical user interface, a second search node corresponding to the selection of one of the first plurality of nodes, and a second plurality of nodes associated with the second search node, in the second cell of the matrix of cells. The method includes receiving, at the client computing device: user input corresponding to a selection of one of the second plurality of nodes; and second node position input corresponding to selecting a third cell of a second selection of cells that are adjacent to the second cell of the matrix of cells, wherein the second selection of cells excludes the first cell. The method includes generating, by the client computing device on the display of the client computing device, on the graphical user interface, a third search node corresponding to the selection of one of the second plurality of nodes and a third plurality of nodes associated with the third search node, in the third cell of the matrix of cells, wherein the first search node is connected to the second search node by a first linking member, and the second search node is connected to the third search node by a second linking member, the interconnected first search node, second search node and third search node forming a path of nodes.

In some embodiments, each cell of the matrix of cells that is occupied by a search node may be surrounded by the same number of adjacent cells.

In some embodiments, the first selection of cells may consist of cells of four cells arranged around the first cell of the matrix of cells, wherein the second selection of cells may consist of cells of four cells arranged around the second cell of the matrix of cells, and wherein the first cell may be an occupied cell of the four cells around the second cell.

In some embodiments, the graphical user interface may center on a last search node that has been generated on the graphical user interface as a function of user node selection input.

In some embodiments, the first linking member may include a visual component showing search directionality from the first search node to the second search node, and the second linking member may include a visual component showing search directionality from the second search node to the third search node.

In some embodiments, each of the first node position input and the second node position input may be one of: a positioning by a user of the selected one of respectively the first or second plurality of nodes into respectively one of the first selection of cells or one of the second selection of cells position; and a selection of an option to automatically position respectively the selection of one of the first plurality of nodes or the selection of one of the second plurality of nodes into respectively one of the first selection of cells or one of the second selection of cells position.

In some embodiments, the method may include receiving, at the client computing device, input to collapse the path composed of the second search node, the second linking member and the third search node; removing the second search node, the second linking member and the third search node from the graphical user interface, wherein the second search node is returned as one of the first plurality of nodes, wherein the second cell is available to be occupied by a new search node selectable from the first plurality of nodes associated with the first search node.

Another broad aspect is a computer device including a memory to store data and instructions, a processor in communication with the memory, a user input interface, a display. The computer device includes a search and navigation application program accessible via the memory and the processor, wherein the search and navigation application program is operable to render, on the display of the client computing device, the graphical user interface representable as a matrix of cells of equal dimensions, comprising a first search node appearing in a first cell of the matrix of cells, and a first plurality of nodes associated with the first search node; receive, from the user input interface: user node selection input corresponding to a selection of one of the first plurality of nodes; and first node position input corresponding to selecting a second cell of a first selection of cells that are adjacent to the first cell of the matrix of cells; generate, on the graphical user interface, a second search node corresponding to the selection of one of the first plurality of nodes, and a second plurality of nodes associated with the second search node, in the second cell of the matrix of cells; receive, from the user input interface user input corresponding to a selection of one of the second plurality of nodes; and second node position input corresponding to selecting a third cell of a second selection of cells that are adjacent to the second cell of the matrix of cells, wherein the second selection of cells excludes the first cell; and generate, on the graphical user interface, a third search node corresponding to the selection of one of the second plurality of nodes and a third plurality of nodes associated with the third search node, in the third cell of the matrix of cells, wherein the first search node is connected to the second search node by a first linking member, and the second search node is connected to the third search node by a second linking member, the interconnected first search node, second search node and third search node forming a path of nodes.

In some embodiments, each cell of the matrix of cells that is occupied by a search node may be surrounded by the same number of adjacent cells.

In some embodiments, the first selection of cells may consist of cells of four cells arranged around the first cell of the matrix of cells, wherein the second selection of cells may consist of cells of four cells arranged around the second cell of the matrix of cells, and wherein the first cell may be an occupied cell of the four cells around the second cell.

In some embodiments, the field of view of the graphical user interface may center on a last search node that has been generated on the graphical user interface as a function of user node selection input.

In some embodiments, the first linking member may include a visual component showing search directionality from the first search node to the second search node, and the second linking member may include a visual component showing search directionality from the second search node to the third search node.

In some embodiments, each of the first node position input and the second node position input may be one of a positioning by a user of the selected one of respectively the first or second plurality of nodes into respectively one of the first selection of cells or one of the second selection of cells; and a selection of an option to automatically position respectively the selection of one of the first plurality of nodes or the selection of one of the second plurality of nodes into respectively one of the first selection of cells or one of the second selection of cells.

In some embodiments, the search and navigation application program may be further operable to: receive, on the graphical user interface, from the user input interface, input to collapse the path composed of the second search node, the second linking member and the third search node; remove the second search node, the second linking member and the third search node from the graphical user interface, wherein the second search node is returned as one of the first plurality of nodes, wherein the second cell is available to be occupied by a new search node selectable from the first plurality of nodes associated with the first search node.

Another broad aspect is a computer-readable medium storing instructions executable by a computer device. The medium includes at least one instruction for causing the computer device to render a graphical user interface representable as a matrix of cells of equal dimensions, comprising a first search node appearing in a first cell of the matrix of cells, and a first plurality of nodes associated with the first search node; at least one instruction for causing the computer device to be adapted to receive: user node selection input corresponding to a selection of one of the first plurality of nodes; and first node position input corresponding to selecting a second cell of a first selection of cells that are adjacent to the first cell of the matrix of cells; at least one instruction for causing the computer device to generate on the graphical user interface a second search node corresponding to the selection of one of the first plurality of nodes, and a second plurality of nodes associated with the second search node, in the second cell of the matrix of cells; at least one instruction for causing the computer device to be adapted to receive at the client computing device: user input corresponding to a selection of one of the second plurality of nodes; and second node position input corresponding to selecting a third cell of a second selection of cells that are adjacent to the second cell of the matrix of cells, wherein the second selection of cells excludes the first cell; and at least one instruction for causing the computer device to generate on the graphical user interface a third search node corresponding to the selection of one of the second plurality of nodes and a third plurality of nodes associated with the third search node, in the third cell of the matrix of cells, wherein the first search node is connected to the second search node by a first linking member, and the second search node is connected to the third search node by a second linking member, the interconnected first search node, second search node and third search node forming a path of nodes.

Another broad aspect is a method performed on a client computing device for providing a Venn Diagram search node on a graphical user interface. The method includes receiving from a user, on a graphical user interface rendered on the display of the client computing device, a first node selection input of a first node related to a first node data structure, and wherein the first node is associated with a first plurality of peripheral nodes. The method includes generating a query for node information of one or more node data structures associated with at least one node data structure of the first plurality of peripheral nodes. The method includes receiving the node information of one or more node data structures associated with at least one node data structure of the first plurality of peripheral nodes. The method includes generating, on the graphical user interface, node selection options of possible second nodes to form a Venn Diagram search node based on the node information, the node selection options selectable by the user. The method includes receiving from the user, on the graphical user interface, a second node selection input of a second node, the second node related to a second node data structure, the node selection input corresponding to the user selecting one of the node selection options, wherein the second node is associated with a second plurality of peripheral nodes. The method includes generating, by the client computing device on the display of the client computing device, on the graphical user interface the Venn Diagram search node corresponding to the first node and the second node selected by the user, wherein the Venn diagram search node is associated with a third plurality of peripheral nodes including the peripheral nodes that are common to both the first plurality of nodes and the second plurality of nodes.

In some embodiments, a node data structure may be related to at least one of the first plurality of peripheral nodes based on data contained in one or more linking member data structures.

In some embodiments, the user selection input of a first node may correspond to the user selecting one of a set of initial node selection options.

In some embodiments, the set of initial selection options may be generated from a string of characters inputted by a user in a search bar generated on the graphical user interface by the client computing device.

BRIEF DESCRIPTION OF THE DRAWINGS

The invention will be better understood by way of the following detailed description of embodiments of the invention with reference to the appended drawings, in which.

DETAILED DESCRIPTION

Definitions

Figure 1:
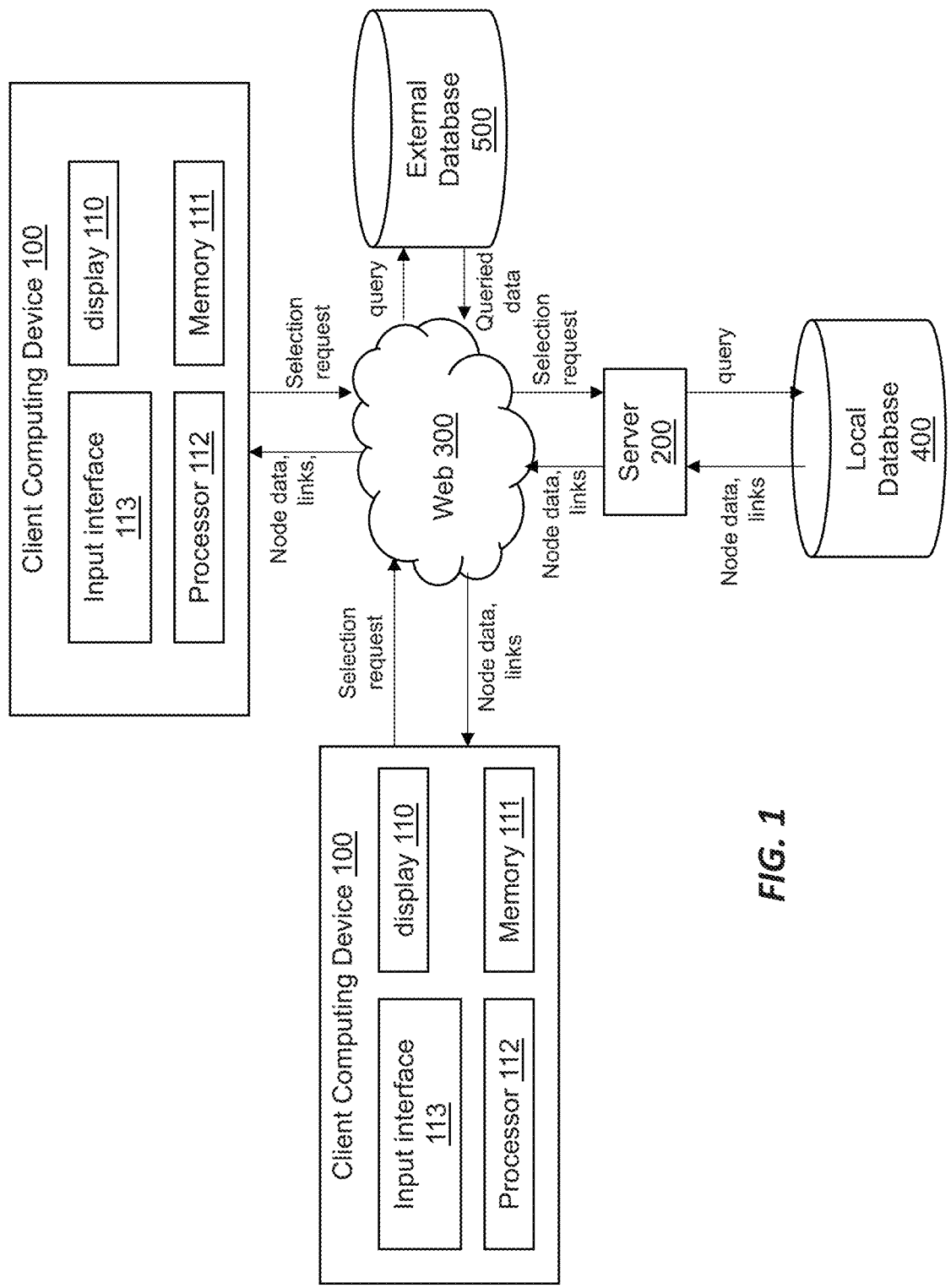
FIG. 1 is a block diagram of an exemplary navigation network for conducting a search through multiple databases.

In the present disclosure, "computing device" includes, but is not limited to, a desktop computer, a laptop, a smartphone, a tablet computer, etc.

In the present disclosure, by "graphical user interface" it is meant a user interface that allows the user to interact with the computing device through, e.g., graphical icons, visual components (e.g. secondary notation), etc.

In the present disclosure, by "node" it is meant a graphical icon appearing on the graphical user interface of the navigation platform, associated with a resource (i.e. node data structure). The node may include a string of characters that identifies the information of the node data structure associated with the node. For example, if the node data structure is a set of data that provides information on a given topic (including identifying the sources of information on a given topic), such as "quantum physics", then the string of characters may be "quantum physics". In another example, if the resource is a user profile page, where the node data structure includes information on the user corresponding to the profile page (e.g. picture of the user; age; profession; biography; etc.), the string of characters may be, for example, the name of the physical person, the organisation or entity associated with the user profile. In some examples, the node is represented as a shape, with, e.g., a circular form, a parallelogram form, etc. Selecting the node may allow the user to access information on the node stored in a database, via, e.g., an API or a webhook.

The node data structures (and the nodes) may be classified based on an ontological classification, categorization or clustering methods such that the related node data structures can be queried based on a node selection made a user as explained herein. This classification allows for the establishment of associations between the nodes (and between the node data structures). For instance, in the present application, by "class" as a field of a topic node data structure, this field contains information accessed and parsed for filtering options as explained herein.

In the present disclosure, by "linking member" it is meant a visual component that connects two other icons (e.g. two nodes) appearing on the graphical user interface (e.g. may be a stippled line connecting two nodes). The linking member may also include a visual indication of directionality of a search, such as an indication as to which node is the subject node, and which node is the object node as described herein. The linking member may be associated with a linking member data structure, the linking member data structure providing information on the specific link (e.g. a link title corresponding to the predicate; a metric related to the linking member (e.g. a trustworthiness score); a description explaining the link between the two nodes, etc.) Therefore, the linking member data structure may provide information on the causal or factual relationship between two nodes, information on the causal or factual relationship displayable when selecting the linking member.

Navigation Network:

The navigation system of the present disclosure provides a graphical layout for conducting a search through a variety of topics and different categories of information. The system provides the user with a visual rendering of the search path taken, the different search selections viewed as nodes on the graphical user interface. The nodes are interlinked by linking members, the linking member providing an indication of connectivity between the nodes, tracing out the path taken when conducting the search. The linking member may also include an indicator of directionality (e.g. an arrow), visually illustrating the subject node and the interlinked object node.

The system may have access to information from one or multiple databases, where the information may relate to distinct topics. The node data structures, associated with the nodes that can appear on the graphical user interface, contain data for classifying information from the databases into defined topics. The linking members represent the interrelation between the nodes, and therefore the node data structures.

Reference is made to FIG. 1, illustrating an exemplary network architecture, where client computing devices are connected or connectable to an external server for performing a search. The external server can access a local database 400 and/or external database(s) 500 to query information relating to the search request.

More than one computing device 100 may be connected to the server 200 and use the navigation system of the present disclosure. The navigation system may be accessible through the web 300, using, e.g., a browser, or an application program that is stored in the memory of a computing device 100.

A client application program may be stored in the memory of the computing device 100 that is associated with the system, the client application program providing the user with an interface to interact with the system. In other examples, the user may access a website that allows the user to communicate with the system.

A host server 200 may be connected to external databases 500 and client computing devices 100 through the web 300. The host server 200 may be one or more computing devices for carrying out search operations of the search. For instance, the server 200 may carry out the queries in the external databases 500 by sending out a query for information as a function of a search selection made by the user using the client's computing device 100.

The client computing device 100 may be a laptop, desktop computer, smartphone, tablet, etc. The client computing device 100 has an input interface 113 for receiving input from a user (e.g. a touchscreen, a keyboard, a mouse, a microphone, an accelerometer, etc.). The client computing device 100 has a display 110 (e.g. a screen) on which the graphical user interface of the client application program is displayed.

The client computing device 100 has a processor 112. The processor 112 may be a general-purpose programmable processor. In this example, the processor 112 is shown as being unitary, but the processor may also be multicore, or distributed (e.g. a multi-processor).

The client computing device 100 has memory 111. The computer readable memory 111 stores program instructions and data used by the processor 112. The computer readable memory 111, though shown as unitary for simplicity in the present example, may comprise multiple memory modules and/or caching. In particular, it may comprise several layers of memory such as a hard drive, external drive (e.g. SD card storage) or the like and a faster and smaller RAM module. The RAM module may store data and/or program code currently being, recently being or soon to be processed by the processor 112 as well as cache data and/or program code from a hard drive. A hard drive may store program code and be accessed to retrieve such code for execution by the processor 112.

The client computing device 100 may also have a graphics processing unit for generating the graphical user interface on the display 110.

The processor 112, the memory 111 and the input interface 113 may be linked via BUS connections.

The server 200 may be in communication with a local database 400. The local database 400 may be computer readable memory. The server 200 may access the local database 400 via a wired or wireless connection. The local database 400 may be integral to the server 200 or separate.

The node data structures may be stored in the local database 400. User profile information may be stored in the local database 400. The local database 400 may also store metadata regarding the address, the contents, size, ownership, etc., of the external databases 500 that are associated with the navigation system. In some examples, the information on the external database 500 may be contained in the node data structure. The local database 400 may be the memory of the computing device of the server 200, or remote or Cloud storage.

Despite FIG. 1 showing only two computing devices 100 for purposes of illustration, that are part of the navigation infrastructure, it will be understood that one or more than two computing devices 100 may be connected to the navigation infrastructure shown in FIG. 1.

When a user, while using the navigation system as explained herein, performs a search, a search selection request can be sent over the web 300 to the server 200. The server 200 receives the query. Depending on the nature of the information to be queried, the server 200 may submit a query (e.g. a new reformulated query) to an external database 500 (e.g. in the native format of the external database 500) to retrieve information from the database. In other examples, the sought information may be stored in the local database 400, and instead the server 200 may retrieve the information from the local database 400 (e.g. information contained in a node data structure, linking member data structure, etc.) The queried information, once received by the server 200, is then transmitted over the web 300 to the computing device 100 that has made the search selection. The information is presented to the user through the graphical user interface appearing on the display 110 of the user's client computing device 100.

Figure 2:
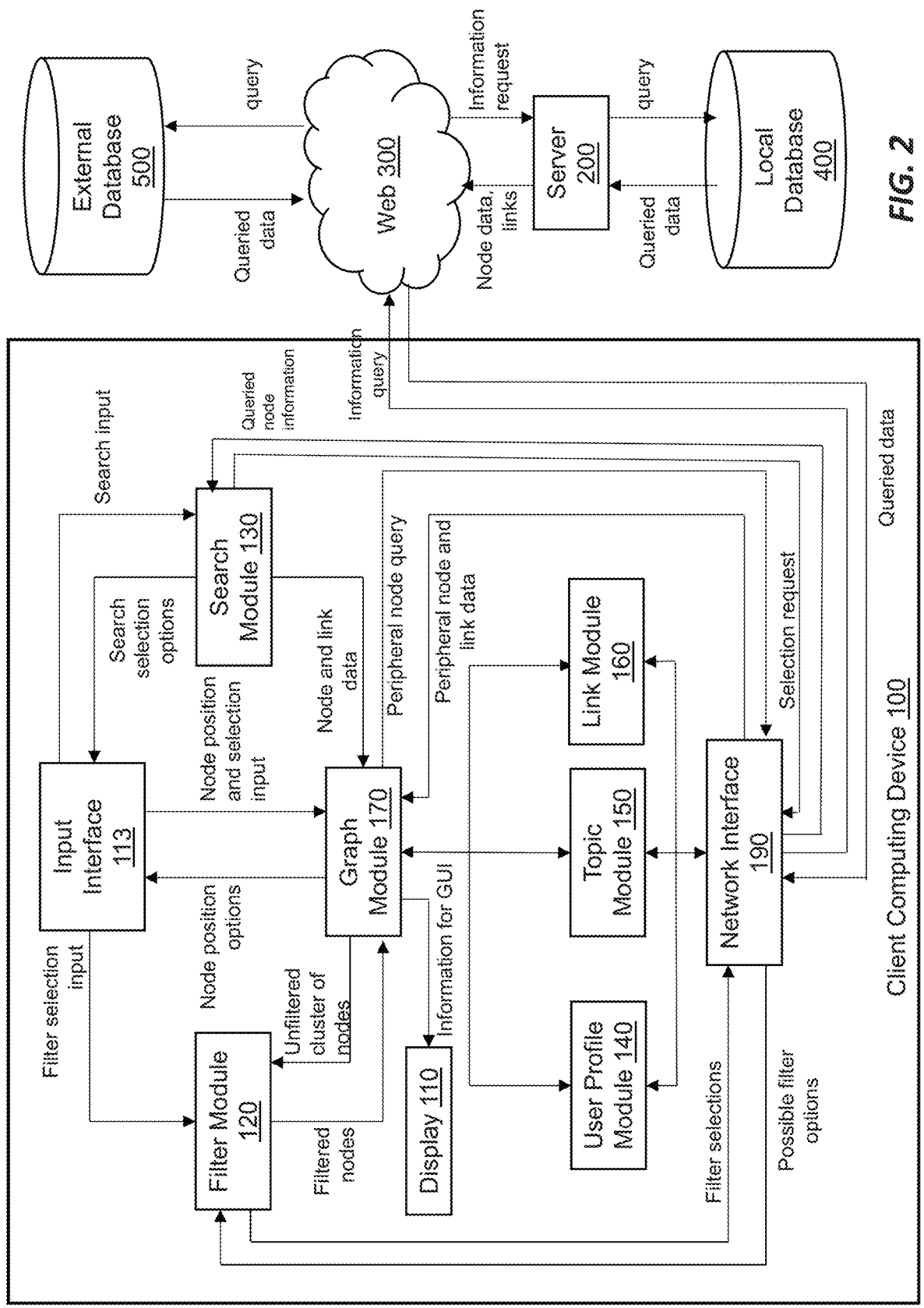
FIG. 2 is a block diagram of an exemplary navigation system, where an external server is connected or connectable to a client device.

The Navigation System:

Reference is now made to FIG. 2, illustrating an exemplary navigation system, where exemplary program code architecture of the client-end of the navigation system is stored in memory and executable by a processor of the client computing device 100. FIG. 2 illustrates the computing device 100 in communication with the server 200 through the web 300, such that information can be retrieved from the local database 400 and the external database 500, where the retrieved information can be sent back to the client computing device 100. It will be understood that, in other examples, some of the functions shown to be carried out by the exemplary computing device 100 may be performed by the server 200.

For purposes of illustration, FIG. 2 shows there being one external database 500. However, it will be understood that server 200 may be in communication through the web 300 with multiple external databases 500 (or multiple local databases 200) without departing from the present teachings.

Figure 6:
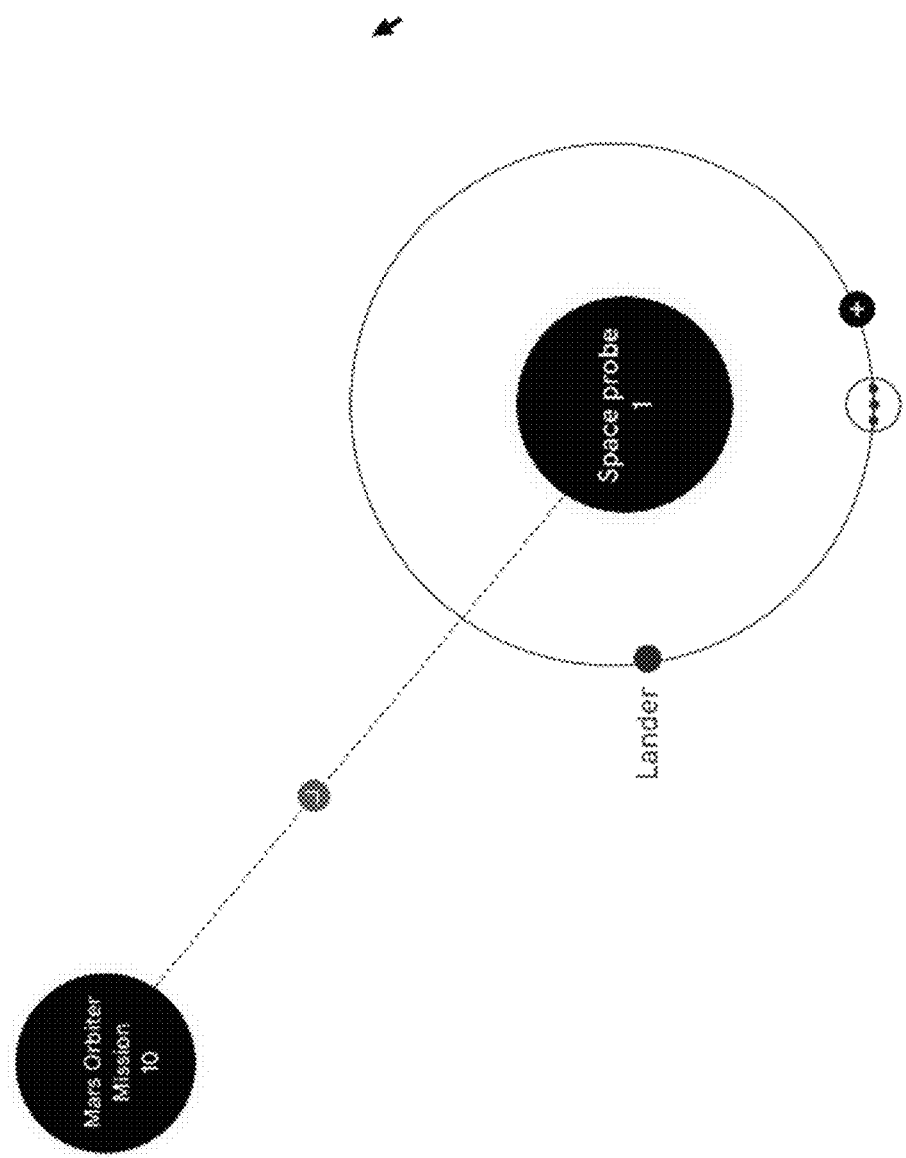
FIG. 6 is a drawing of an exemplary graphical user interface displaying a first search node connected to a second search node via a linking member.

The navigation system functions by allowing a user to navigate through nodes, where each node may be associated with a label of a topic or a user profile. As shown in the example of FIG. 6, a search node (the node that represents either the initial node of a search or a node that is selected, or has been selected by a user during a node search) is surrounded by at least one peripheral node. In the present disclosure, by "search nodes", it includes each of the nodes that has been selected by the user during a search by providing search selection input, as well as the search node that has been currently selected by the user. Each of the peripheral nodes is also associated with a label, the label representing a topic or a user profile. The nodes of the peripheral nodes are related to the search node. For instance, if the search node is associated to a topic, each node of the peripheral nodes may be associated to a topic or user profile that is related to the topic of the search node. In the example of FIG. 6, the search node is associated to the topic "space probe". The peripheral node is associated with the topic "lander". The topic of the search node and the topic of the peripheral node are related, where a "lander" is a "type of" "space probe", where "type of" is the predicate in the example of FIG. 6. Therefore, the topic or user profile related to the search node may be associated by a predicate (examples of predicates may be "related to", "causes", "is a type of", etc.) to each of the topics or user profiles associated with respectively each of the peripheral nodes. The search node, the predicate and the peripheral node form a semantic triple, a subject-predicate-object relationship.

Figure 5A:
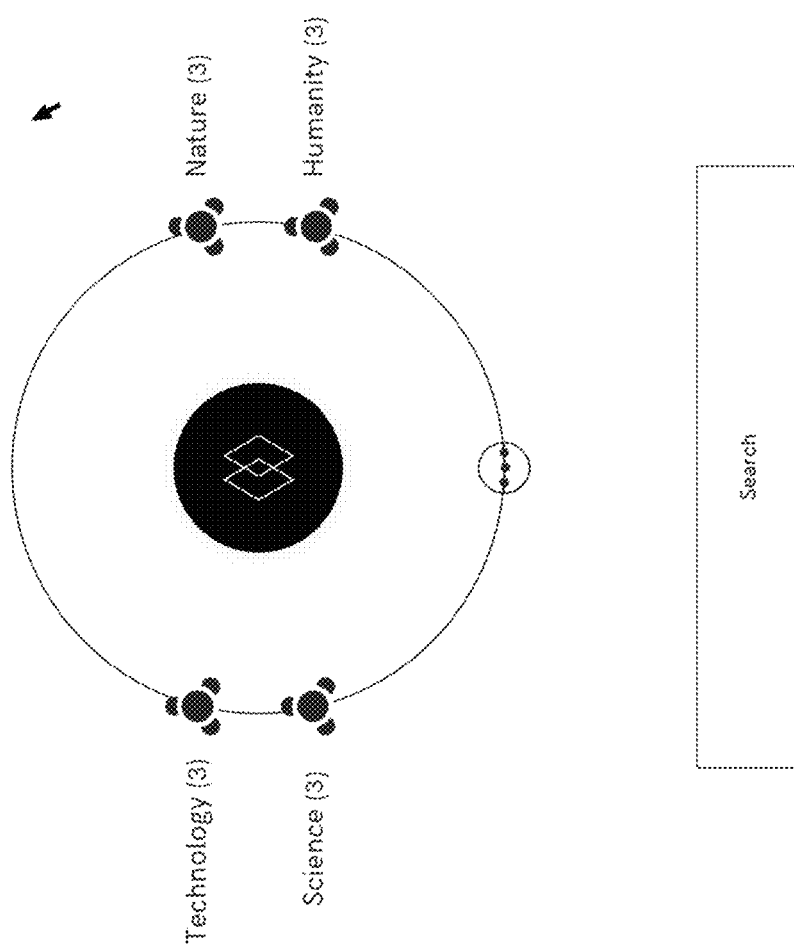
FIG. 5A is a drawing of an exemplary graphical user interface displaying an initial search node surrounded by a plurality of four peripheral nodes.

In some examples, there may be an initial search node, as shown in FIG. 5A. The initial search node may be a starting node, where peripheral nodes associated to, e.g., a topic are presented to the user. The initial search node of FIG. 5A is itself not associated to a topic, however its peripheral nodes are associated to topics. For instance, as shown in FIG. 5A, the starting topics associated with the peripheral nodes of the initial search node may be "Technology", "Nature", "Science" and "Humanity". In some examples, the initial search node may be associated with a class topic instead of a regular topic or user profile, where a class topic confers its class or category upon topics associated with peripheral nodes of this initial search node—such class topics are so defined for purposes of classifying topics associated with groups of peripheral nodes to which they are associated, such that a label or category representing the "class" of the class topic may be generated in the graphical user interface and employed through the use of the filter module to filter the graphical user interface for specific nodes belonging to such a label or category, as explained herein. In some cases, the initial search node may be surrounded by any number of peripheral nodes, some or all of which may be associated with topics representing classes. For instance, as shown in FIG. 5A, the topics associated with the peripheral nodes of the initial search node are the following class topics: "Technology", "Nature", "Science" and "Humanity". As shown in FIG. 5A, class topics may have a different visual representation as compared to regular topics. In present disclosure, unless specifically distinguished, the term "topic(s)" may refer to either (a) regular topic or (a) class topic(s).

Figure 8:
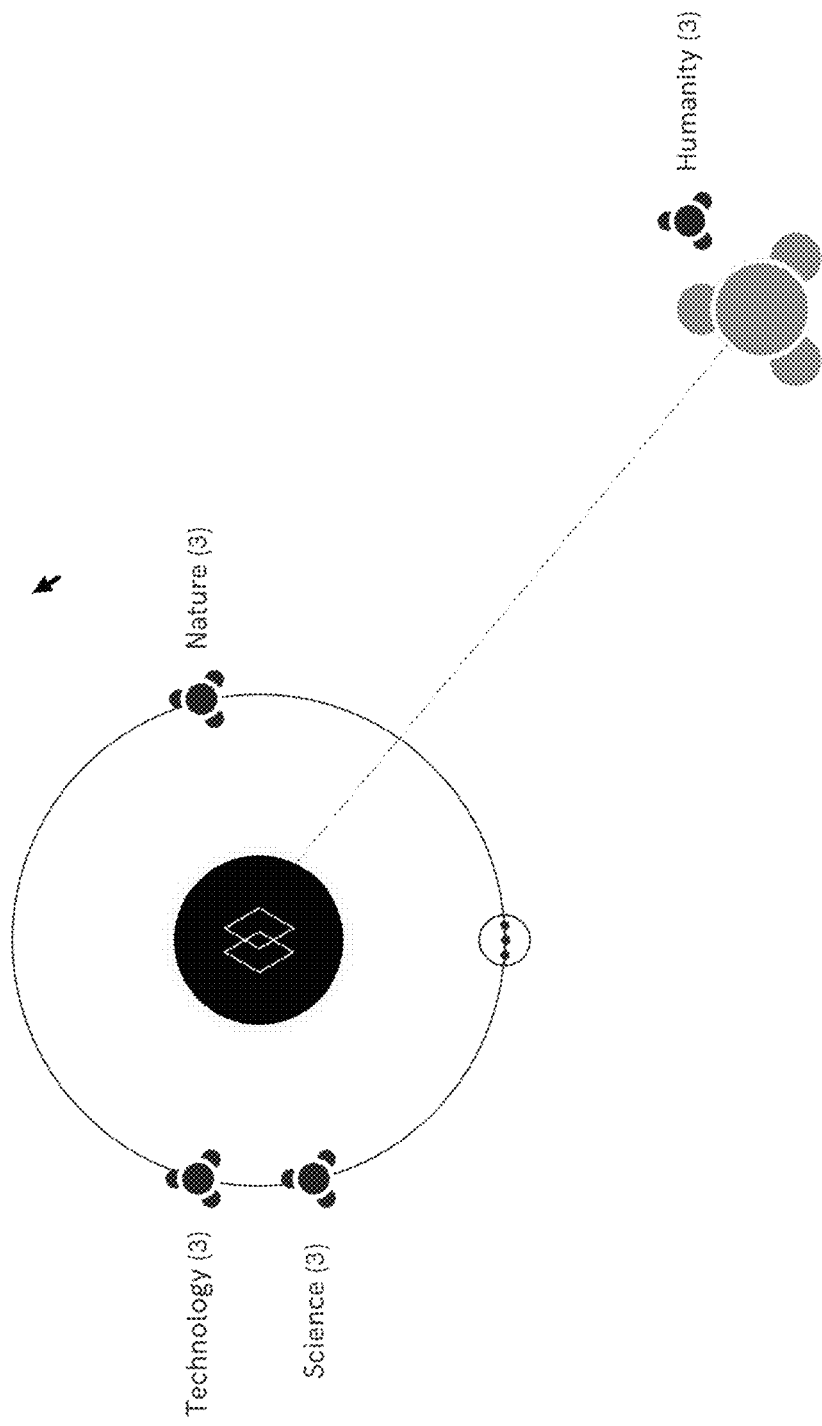
FIG. 8 is a drawing of an exemplary graphical user interface displaying a first search node and a positioning of a second search node corresponding to a selection of one of the peripheral nodes associated with the first search node.

As shown in FIG. 8, the user may then select amongst the peripheral nodes one of the peripheral nodes that amounts to the next step of the search. The selected peripheral node may then be positioned on the graphical user interface. In some examples, the user may only position the selected peripheral nodes at predetermined positions, the positions predetermined by the graph module 170 as explained herein. As shown in FIG. 8, the graph module 170 then generates the next search node corresponding to the selected peripheral node and the node position input received from the user. In turn, the graph module 170 generates the peripheral nodes associated with topics or profile nodes that are related to the topic or user profile of the second search node. These peripheral nodes related to the second search node become the search options that may be selected by the user to further the search. As such, the user may continue to select peripheral nodes until the user lands on a topic of interest. The path of search nodes forms a branch, and where multiple paths of search nodes can be taken, forming multiple branches. The user may retain the option of selecting a peripheral node of one of the previous search nodes to pursue the search by following another path of topics.

Each of the nodes is associated with a node data structure. The node data structure contains information on a user profile or on a given topic, depicted as a node appearing on the graphical user interface. The node data structure may be stored in the local database 400, retrievable by the server 200 when appropriate input has been received at the level of the client navigation architecture.

Figure 10:
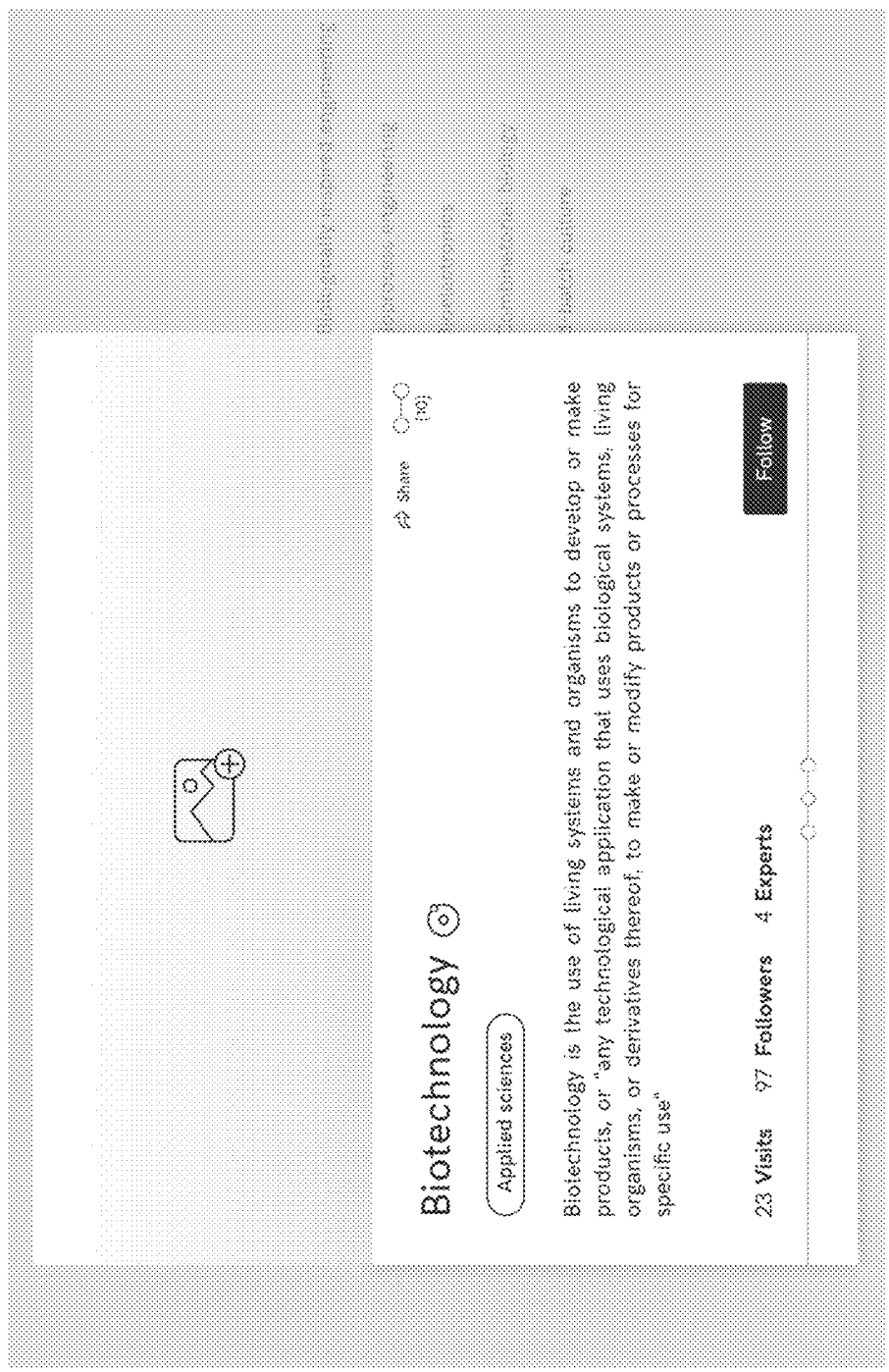
FIG. 10 is a drawing of an exemplary graphical user interface displaying an exemplary window with information on a topic associated with the topic related to a node.
Figure 11A:
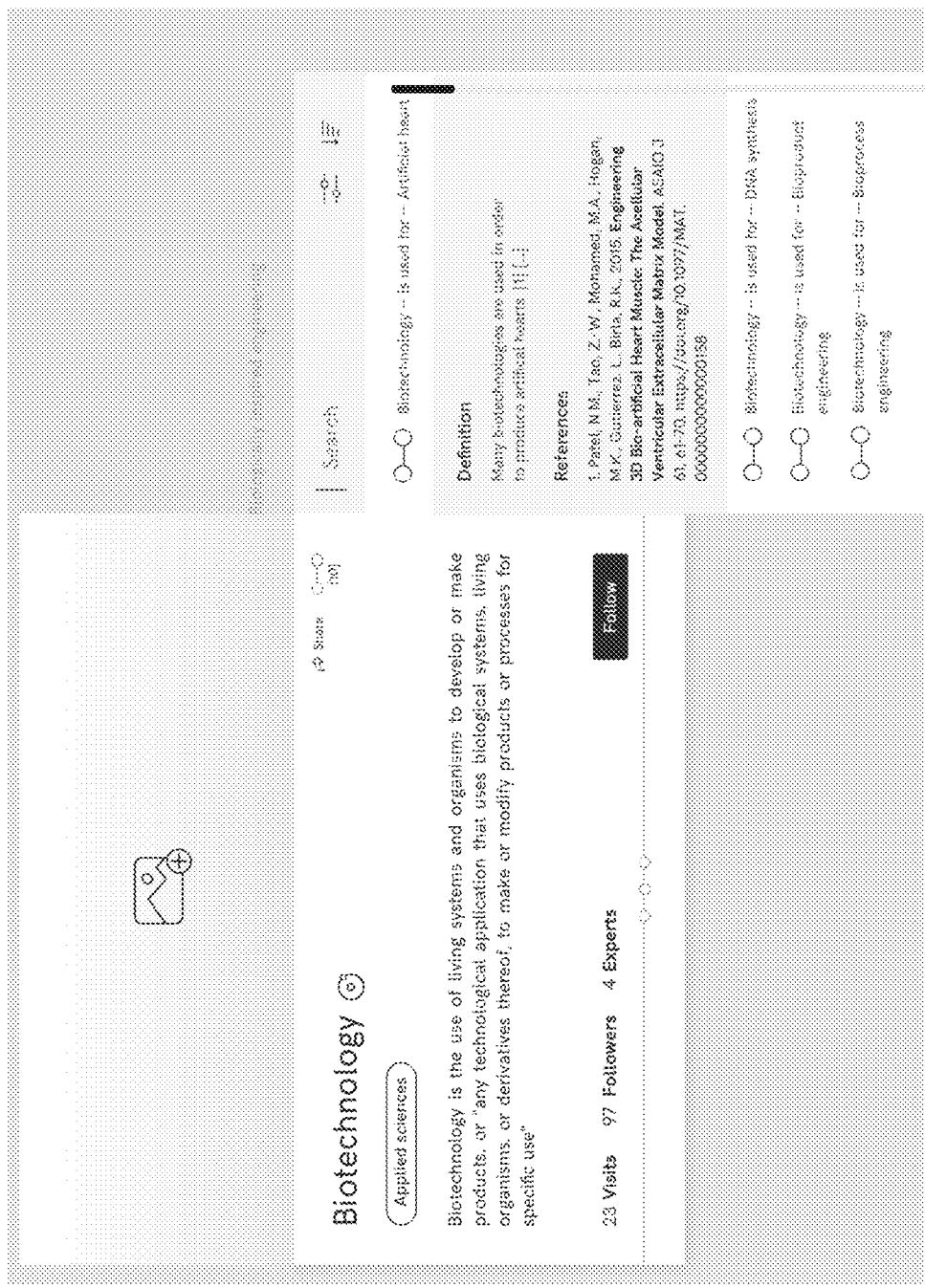
FIG. 11A is a drawing of an exemplary graphical user interface displaying an exemplary window with information on a topic associated with a node and an exemplary window providing information on an exemplary link member associating two search nodes.
Figure 11B:
FIG. 11B is a drawing of an exemplary graphical user interface displaying an exemplary window with information on a user associated with a user profile node.

For instance, the user may select an option to display more details on the search node (and in some cases, and/or the peripheral nodes). In this example, a window, as shown in FIGS. 10 and 11A, may appear. The window contains information on the topic associated with the search node. The information generated on the window may be retrieved from the memory of the local database 400 by the server 200, the client navigation architecture populating the topic window once the appropriate information has been retrieved from the local database 200. FIG. 11B depicts an exemplary window that can appear to provide additional information on a user profile node associated with a user profile node data structure. As shown in FIG. 11B, the additional information may include, for instance, the name of the user, a biography on the user, the location of the user, the occupation of the user, scientific or other articles written by the user, the expertise level of the user on certain topics as rated by other users, other metrics that measure activity, etc. It will be understood that the information displayed in the window of the user profile node may vary without departing from the present teachings.

The program code architecture of the client-end of the navigation system has a search module 130, a graph module 170 and a network interface 190. The program code architecture of the client-end of the navigation system may have a filter module 120, a user profile module 140, a topic module 150 and a link module 160.

The graph module 170 communicates with the display 110 of the client computing device 100.

The graph module 170, filter module 120 and search module 130 receive user input from the input interface 113.

The user input interface 113 is configured to receive input from a user provided using, e.g., a keyboard, a mouse, a touchscreen, a microphone, an accelerometer, a camera, etc.

The network interface 190 connects the computing device 100 to the web 300 (e.g. Internet) as is known in the art, and may establish a remote connection with a remote server (e.g. server 200). For example, the network interface 190 may be an Ethernet port, a WAN port, a TCP port, etc.

The graph module 170 comprises program code for managing and processing a graph structure of nodes appearing on the graphical user interface. The graph structure is composed of nodes and linking members and shows the path of nodes representing the search selections of the user. The graph module 170 generates the nodes and generates the linking members on the graphical user interface.

The graph module 170 also includes program code to provide node position options to a user, i.e. areas on the graphical user interface in which the next node(s) of the search can be positioned and generated. In some examples, the graph module 170 receives node selection input from the user (transmitted by the input interface 113) and generates the node at the selected position. In some examples, the graph module 170 may receive, as node position input, a selection from a user, to automatically select one of the node position options. Upon receiving the automatic selection input, the graph module 170 may, in some embodiments, analyze the crowdedness of the cells surrounding the current search node, to identify the cell with the least amount of occupied cells surrounding that cell. The next search node may then be generated in the least crowded cell. In other examples, the node may be generated randomly in one of the unoccupied cells surrounding the cell of the search node. In other examples, the search node may occupy the cell of a previously generated search node.

In some examples, in cases where all of the surrounded adjacent cells are occupied by search nodes, and the user provides input to create a new search node, the graph module 170 may identify (e.g. retrieve data stored in memory) the first created search node, and replace the first created search node with the new search node.

The graph module 170 may also include program code to, upon receiving appropriate input from the user (e.g. the graphical user interface may provide, for each node a "collapse" option), remove one of the search nodes or a plurality of search nodes connected by linking members and forming a branch, rearrange branches of search nodes connected by linking members, etc. For instance, the user may provide input to collapse a branch of search nodes, or a series of interconnected search nodes. The graph module 170, upon receiving the user input, may remove the search nodes and the linking members between the search nodes of the specific branch selected by the user. The second search node that is associated to the first search node on which the user has provided the collapse input may return as a peripheral node of the first search node.

The filter module 120 includes program code to filter peripheral nodes surrounding a search node based on filter options inputted by the user. The filter module 120 may also include program code to generate filter options for the user, where the filter options may be generated as a function of the peripheral nodes surrounding the search node. The filter options may be based on descriptive labels, categories or parameters, contained within an ontology or knowledge classification system of the topics of the navigation system. For instance, a filter option may be "Vehicles", where the user may select to include only nodes relating to vehicles, or exclude nodes relating to vehicles. The filter module 120 receives the filter input from the user, verifies the tag associated with the topics or user profiles for each of the peripheral nodes, and identifies the nodes that relate or do not relate to vehicles. The filter module 120 may then send the generated list of nodes that correspond or do not correspond to the filter options to the graph module 170. In turn, the graph module 170 may remove from the graphical user interface the peripheral nodes corresponding (or that do not correspond) to the filter input received from the filter module 120, identifying the nodes corresponding to the filter options.

The search module 130 includes program code to receive the search selection inputted by the user when the user enters a queried search as a string of characters using, e.g., a search bar. The search module 130 then formulates a search query for transmission to the server 200 based on the string of characters entered by the user. The search module 130 receives from the server 200 node information data corresponding to the nodes that correspond to the search query related to the user's search terms (which may include, e.g., node identification, node titles, and the number of nodes corresponding to the user's search terms). The search module 130 generates on the graphical user interface, e.g., a side window with a list of node options that correspond to the user's entered search terms (where the user may select one of the node options). The user may then select one node amongst the node options, the node selection input transmitted from the input interface 113 to the graph module 170. The user may then select one node amongst the node options, the node selection input transmitted from the input interface 113 to the graph module 170 transmits to the graph module 170 the identification information of the peripheral nodes and the linking members. The graph module 170 may then add to the graphical user interface a peripheral node for each node data structure that is associated with the next search node, and tags or strings of characters appearing on the graphical user interface in association with each peripheral node, and in some examples, each linking member (between the search node and a peripheral node).

The user profile module 140 includes program code for, when called by the graph module 170, requesting from the server 200 the retrieval of information on a user profile node data structure corresponding to a request made by a user (e.g. via an application program interface (API) or webhook—such as a REST webhook). As such, when the user profile module 140 receives the user profile information in accordance with a request made by the user profile module 140, the user profile module 140 may send the user profile information to the graph module 140 such that the graph module 140 may add the information to the graphical user interface. For instance, if the user selects an option to view information on a peripheral node associated with a user profile page, the user profile module 140, once called by the graph module 170, can generate and transmit a request, transmitted to the server 200, to receive the user profile information necessary to populate the graphical user interface (e.g. number of followers of the user profile; age of the user of the user profile; biography of the user of the user profile, etc.). The graph module 170 adds the information such that it appears on the graphical user interface.

The user profile module 140 may also transmit a data submission to update the information contained in a user profile node data structure, such as when a user updates the information on the user's profile page. For instance, if the user updates the "biography" as appearing on the user profile page, the user profile module 140 may, once the user profile module 140 has received the updated information from the graph module 170, transmit information including the string of characters corresponding to the modified biography, a label "biography" for identifying the portion of the user profile node data structure that is to be modified, and an identifier of the user profile and the user profile node data structure that is to be modified (e.g. may be the user profile name).

The user profile module 140 may also transmit a request to create a user profile node data structure, e.g., when a user creates a new user account or a business account. The information entered by the user when creating the account is transmitted to the server 200. The server 200 stores the user information as a user profile node data structure in, e.g., the local database 400.

The topic module 150 includes program code for, when called by the graph module 170, requesting from the server 200 the retrieval of information from a topic node data structure stored in the local database 400 (e.g. via an application program interface (API) or webhook—such as a REST webhook). The topic module 150 generates a request for information required to be generated on the graphical user interface in response to the user's selection. For example, the user may have selected a search node to obtain a window providing a summary of the topic of the search node, as shown in FIG. 11A. In the example of FIG. 11A, at least the topic title, image and the description trustworthiness score may be retrieved from the topic node data structure stored in the local database 400, and retrieved by the server 200. The topic module 150 may issue a submission for the required information, which may include, for instance, an identifier of the topic node data structure, a string of characters forming a label for each field to be retrieved (e.g. "trustworthiness score" and "description"), and/or an identifier of the computer or user making the request. The topic module 150 receives from the server 200, via the network interface 130, the requested information. The topic module 150 may send the node information to the graph module 140 such that the graph module 140 may add the information to the graphical user interface.

The topic module 150 may also submit a request to modify the information contained in a topic node data structure. For instance, if a user provides input corresponding to a new trustworthiness score for a topic node (e.g. the trustworthiness score representing the degree of trustworthiness, or truth value, of the information contained within the topic node), the trustworthiness score stored in the topic node data structure may be updated. For instance, the topic module 150 may send data corresponding to a string of characters identifying the topic node data structure to be updated, a string of characters identifying the field to be updated, and a value corresponding to the trustworthiness score selected by the user. When the server 200 receives the information from the network interface 190, the server may retrieve the topic node data structure from the local database 400, identify the field corresponding to the trustworthiness score, identify the integer value equating to the number of times a user has entered a trustworthiness score for the topic node, add the new trustworthiness score value inputted by the user, increase the integer corresponding to the number of trustworthiness score entries by "+1", divide the score accordingly to reach the new average trustworthiness score, and store the new trustworthiness score in memory (in the topic node data structure stored in the local database 400).

In some examples, the topic module 150 may receive input from a user to create a new topic node. In these examples, the topic module 150 may receive input from the user directly from the input interface 113 or via the graph module 170. The information on the new topic node is transmitted by the topic module 150 via the network interface 190 to the server 200. The server 200 may create a new topic node data structure corresponding to the new topic node, storing in the topic node data structure the data on the topic node corresponding to the user input.

Figure 12:
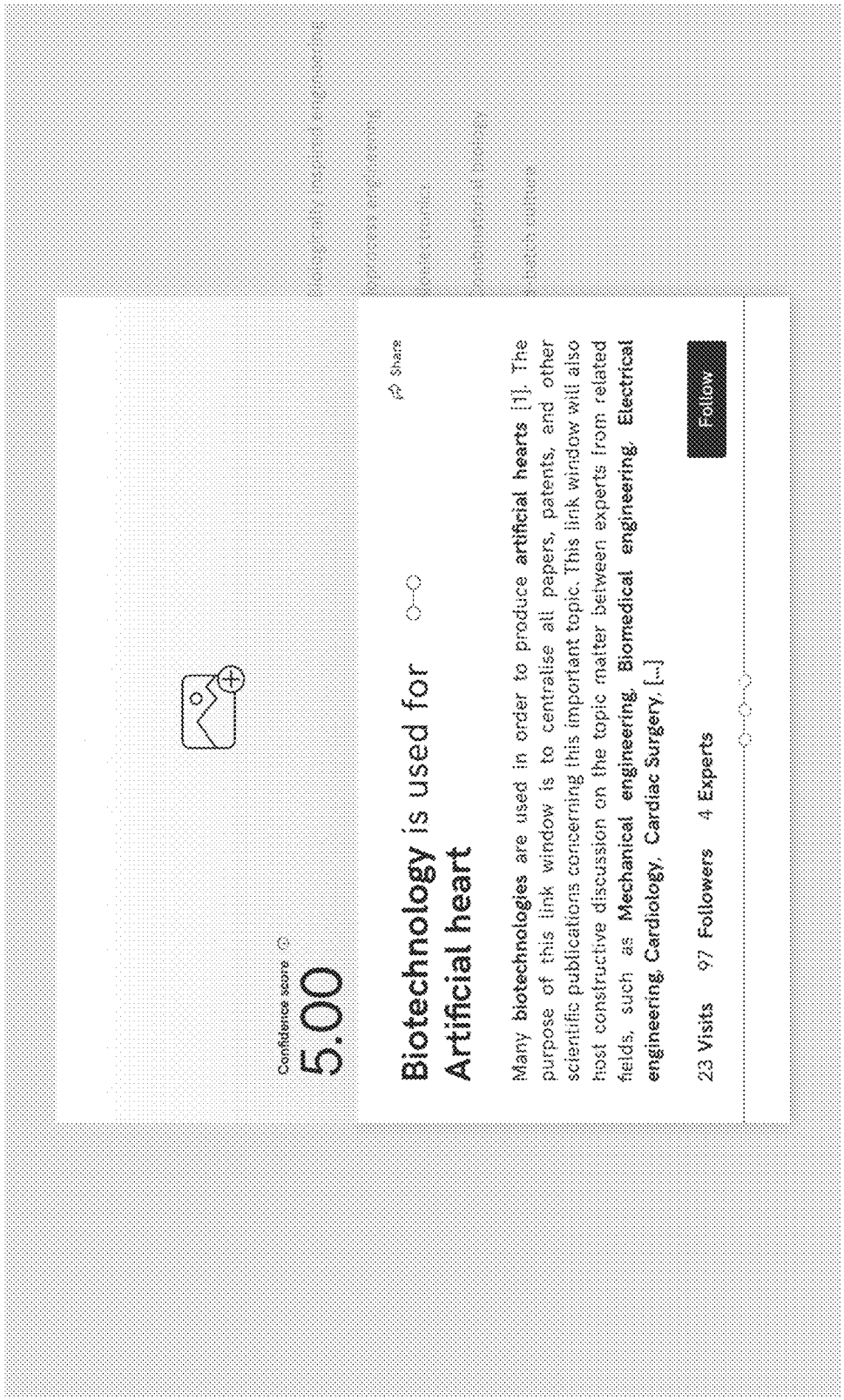
FIG. 12 is a drawing of an exemplary graphical user interface displaying an exemplary window providing information on an exemplary link member associating two search nodes, retrieved from a linking member data structure.

The link module 160 includes program code for, when called by the graph module, retrieving information on a linking member that connects two nodes—where the nodes may be user profile nodes or topic nodes (e.g. via an application program interface (API) or webhook—such as a REST webhook). The linking member is associated with a linking member data structure stored in the local database 400. The link module 160 generates a request to obtain information of a link member data structure associated with a linking member. For instance, the user may select on the graphical user interface a linking member, where information on the linking member may be displayed, for instance, in the form of a window as shown in FIG. 12. In the example of FIG. 12, information on the trustworthiness score of the linking member and the predicate connecting the two nodes is required to populate the window. The link module 160 may generate a request containing, e.g., a string of characters acting as an identifier of the linking member (such that the linking member data structure may be identified), a string of characters identifying the type of data to be queried (e.g. trustworthiness score; predicate), and an identifier of the user who is selecting the option to view the information on the linking member. The request generated by the link module 160 is transmitted by the network interface 190, via the web 300, to the server 200. The server 200 receives the request transmitted by the network interface 190 via the web 300, processes the request, and retrieves from the local database 400 the information corresponding to the request. The server 200 transmits the retrieved information back to the network interface 190 of the client computing device 100. The network interface 190 relays the received data to the link module 160. The link module 160 may verify that the information received corresponds to the initial request. If the information received does correspond to the initial request, the link module 160 may transmit the information to the graph module 170. The graph module 170 in turn populates the fields of the window appearing on the graphical user interface for the linking member (e.g. the trustworthiness score; the nature of the predicate).

In some embodiments, the link module 160 may also include program code to transmit data to a server for modifying the information stored in the local database 400 on a given linking member data structure. The data transmission may contain an identifier of the linking member data structure (or its corresponding linking member) to be modified, an identifier of the category of information to be modified, and the information that is to modify the portion of the linking member data structure stored in memory. For instance, a user may add a trustworthiness score regarding a linking member (e.g. a 5 out of 5), an indication of the accuracy of the causal claim implied by the link connecting two nodes. Once the user has inputted the trustworthiness score, the graph module (or in some examples, the link module 160) may receive the integer corresponding to the trustworthiness score inputted by the user. The link module 160 may generate a data request containing an identifier of the linking member or its linking member data structure to be modified, an identifier of the user who has inputted a trustworthiness score, metadata indicating the category of data to be modified, and an integer corresponding to the trustworthiness score entered by the user. The data request is transmitted to the server 200 via the network interface 190. When the server 200 receives the information from the network interface 190, the server 200 may retrieve the linking member data structure from the local database 400, identify the field corresponding to the trustworthiness score, identify the integer value equating to the number of times a user has entered a trustworthiness score for the linking member, increase the integer corresponding to the number of trustworthiness score entries by "+1", add the new trustworthiness score value inputted by the user, divide the score accordingly by the number of entries (to reach the new average trustworthiness score), and store the new trustworthiness score in memory (in the linking member data structure stored in the local database 400).

In some examples, the link module 160 may also send a request to create a new linking member, resulting in the creation of a new linking member data structure, upon receiving user input to create a new linking member between two nodes specified by the user. The user input corresponding to the new linking member is sent by the link module 160 to the server 200 via the web 300. The server 200 creates a new linking member data structure that stores information on the linking member corresponding to the user input in, e.g., the local database 400.

As such, the portion of the navigation system architecture on the client computing device 100 receives the input of the user, generates the graphical user interface (including the nodes and linking members), requests information from the server 200 as a function of user input via, e.g., an application program interface or webhook, and populates the graphical user interface as a function of the information received from the server 200 (the server 200 retrieving information on nodes and linking members from the corresponding node data structures and linking member data structures stored in the local database 400).

Exemplary Use of a Navigation Graphical User Interface Generated on the Display of a Client Computing Device:

Reference is now made to FIGS. 3 and 5A-12, illustrating examples of a graphical user interface where nodes are used to visualize topics, and the navigation thereof, during a search in accordance with the present teachings.

With reference to FIG. 5, an initial search node may be generated by the graph module 170. The initial search node may include peripheral nodes of broad topics that a user may select to begin navigating through the nodes when performing the search. In the example of FIG. 5A, the peripheral nodes are associated with the topics, identified by labels appearing next to each peripheral node, of "Humanity", "Science", "Nature" and "Technology". It will be understood that the topics appearing in association with the initial search node may vary without departing from the present teachings. The topics shown in FIG. 5A are for purposes of exemplary illustration. For instance, if the navigation system queue was to be used for online shopping, the topics may be "Home", "Recreation", "Work", etc.

As shown in FIG. 8, the user then selects one of the peripheral nodes, providing node selection input, and may select a location for navigating to the selected peripheral node, the node position input and node selection input transmitted to the graph module 170.

Figure 3:
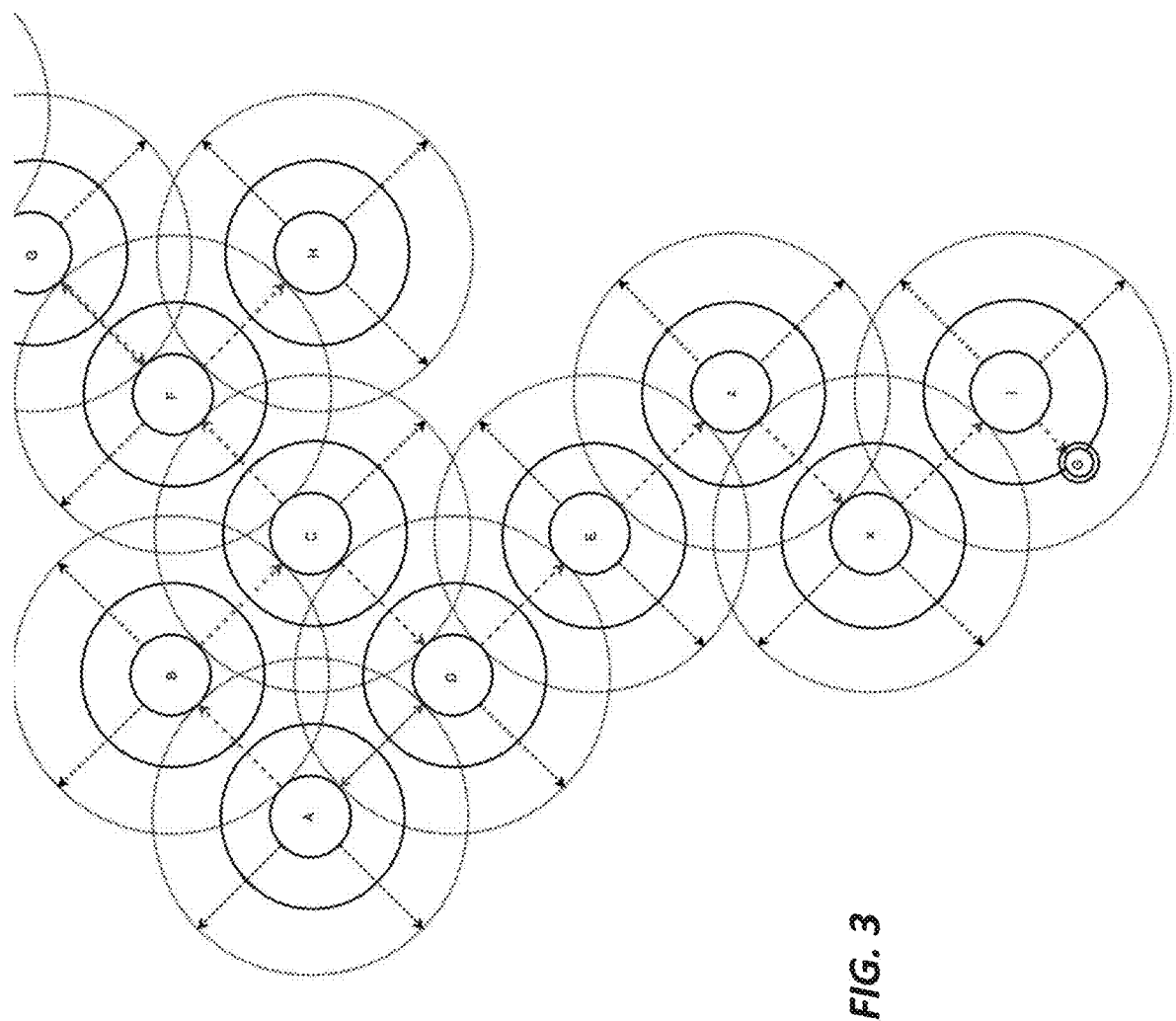
FIG. 3 is a drawing of an exemplary layout of options for a path of nodes during a search.

In some examples, the possible node positions than can be selected by the user are predefined by the graph module 170. For instance, as shown in FIG. 3, illustrating exemplary node position options based on a node navigation path set out by the user in accordance with the node position options provided by the graph module 170, a user can position a peripheral node in one of four cells or quadrants surrounding the target search node. The graph module 170 also verifies which of the four surrounding cells are already occupied by a search node. If the cell is occupied by a search node, then that cell is not presented as a node position option to the user. The user may then select in which available cell, as presented by the node position options, the next search node is to be positioned. In some embodiments, the node position options may be at 90 degrees from one another. In other embodiments, the position of a node position option with respect to the other node position options, and the number and position of the node position options, may vary without departing from the present teachings.

Therefore, the cells providing the node position options may form a matrix of cells (where the term "matrix" may be used herein even though the graphical user interface may not be physically divided into or represented as a matrix of cells). The matrix of cells is to facilitate the management of space on the display, and the branches of search nodes that are generated as a function of the search performed by the user.

Figure 7:
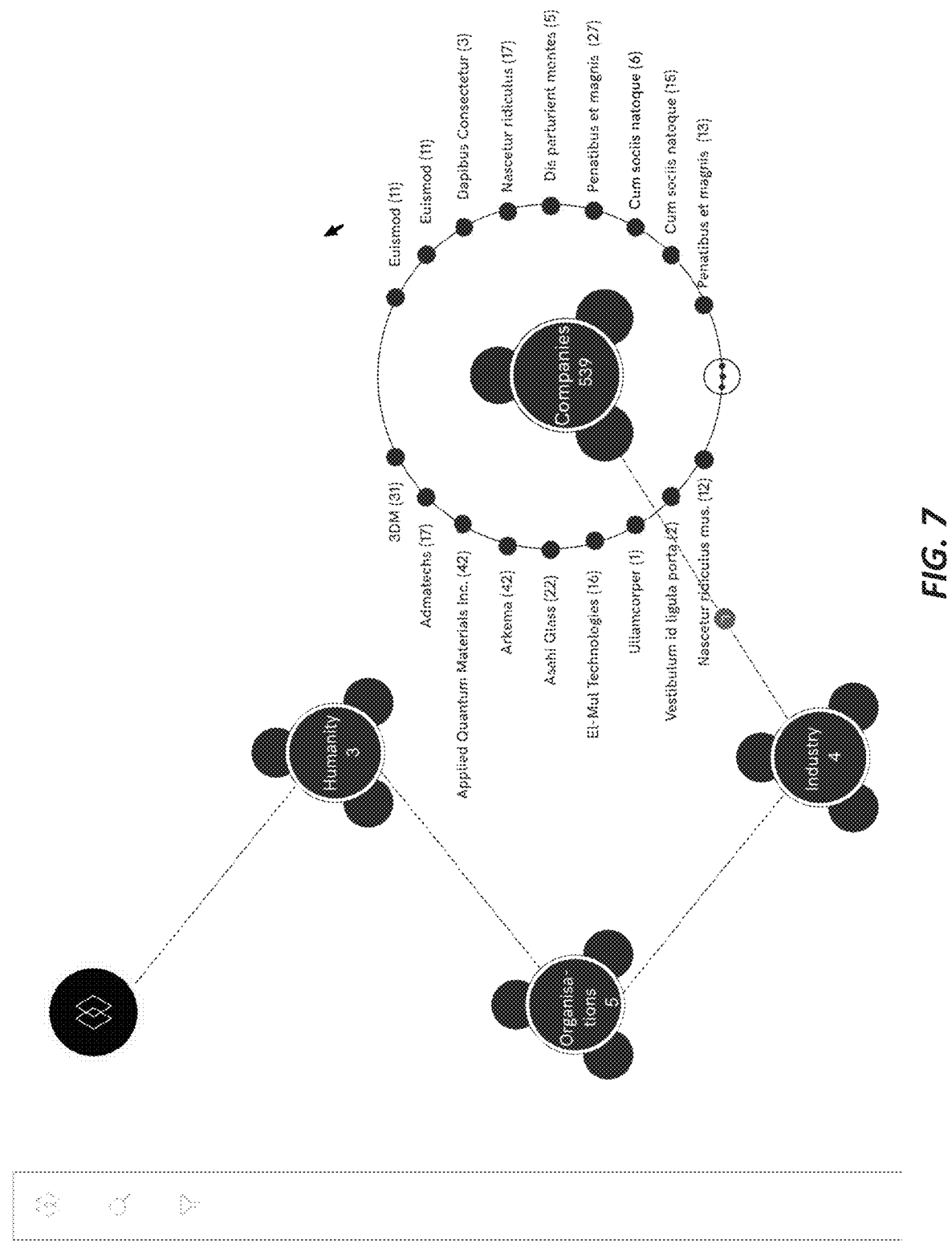
FIG. 7 is a drawing of an exemplary graphical user interface displaying four search nodes interconnected by linking members, where the fourth search node is surrounded by peripheral nodes.

As shown in FIG. 7, the process of selecting a peripheral node of a search node and to positioning it, is repeated during the course of the search. Each search node presents at least one peripheral node that is associated with the search node. As shown in the example of FIG. 7, the peripheral nodes of "Ullamcorper", "Arkema", "3DM", etc., are associated with the topic search node of "companies", where the companies are related to industry.

In some examples, such as in virtual reality or three-dimensional applications, the search path may be represented in three axes (instead of only two axes). The node position options may be defined in accordance with three axes, where the navigation path of the nodes may be defined in 3D space.

As shown in FIG. 7, a linking member may connect two search nodes. The linking member may include an icon indicating directionality (e.g. an arrow) as shown between the search node "Industry" and the search node "Companies", the arrow pointing from the search node "Industry" to the search node "Companies". As a result, "Companies" was once a peripheral node of "Industry" that was selected by the user as the next search node.

The nodes (search node and peripheral nodes) may be associated to either topic node data structures or user profile node data structures.

In some examples, as shown in FIG. 8, the graphical user interface generated by the graph module 170 of the navigation system may present the user with a search box. The user may enter a string of characters into the search box to begin a search. The string of characters may correspond to a user profile or topic of interest. The search module 130 may receive the entered string of characters. The search module 130 may send a request to the server 200 to identify a node data structure corresponding to the string of characters. The server 200 returns to the client computing device 100, and to the search module 130 the identity and/or the label of the corresponding node data structure (and corresponding peripheral nodes and linking members). The search module 130 transmits the label of the corresponding node data structure (and corresponding peripheral nodes and linking members) to the graph module 170. The search node generated by the graph module 170 may correspond to the string of characters entered by the user in the search box.

Figure 9:
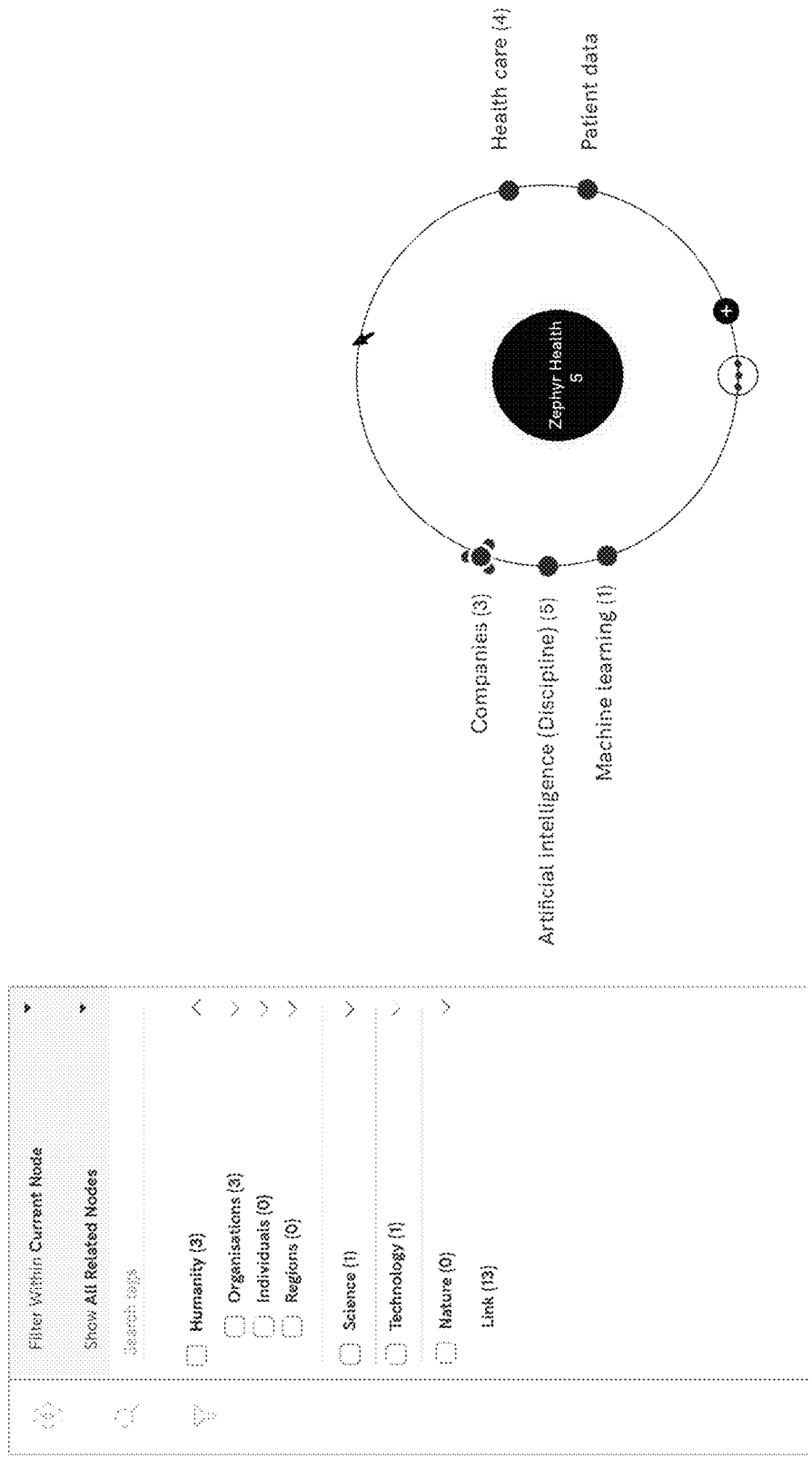
FIG. 9 is a drawing of an exemplary graphical user interface displaying a search node and a side window with an exemplary set of filter options.

As shown in FIG. 9, the user may also select from, e.g., a sidebar, filter options provided by, e.g., a filter module 120 to filter through, e.g., peripheral nodes associated with a search node. This may be practical when there are multiple peripheral nodes associated with a search node (e.g. in some cases, there may be hundreds or thousands).

The user may also select the search node or peripheral node to obtain additional information on the node (e.g. in the form of a window as shown in FIGS. 10, 11A and 11B). The information displayed in the window is retrieved, at the request of the topic module 150 via, e.g., an application program interface or a webhook, from the topic node data structure saved in the local database 400 by the server 200. For instance, as shown in FIG. 10, the node information window shows the trustworthiness score of the topic, a description of the topic, related topics that resulted in the present topic search node (e.g. "science" leading to "disciplines" leading to "applied sciences" leading to "general concepts of sciences". The number of peripheral nodes is also displayed (e.g. in the example of biotechnology as shown in FIG. 10, there are 10 peripheral nodes).

As shown in FIG. 11A, it is also possible to obtain additional information on the linking members connecting the present search node to the peripheral nodes. As shown in FIG. 11A, "Biotechnology" is shown to be "used for" "Artificial heart". The predicate between is "is used for".

As shown in FIG. 12, upon the user providing the corresponding input, the graphical user interface of the navigation system may also display information on a linking member connecting, e.g., two search nodes. The linking member is the graphical representation of the connection between, for example, two search nodes. In FIG. 7, the linking member is depicted as a stippled line. A linking member may also be related to a linking member data structure stored, e.g., in the local database 400. As such, information on the linking member may also be accessed by the user. This may be important for the functioning of the navigation system when search links between nodes may be generated by users. In some examples, a user may submit information using the input interface 113 to generate a new linking member connecting two nodes. However, other users may be able to verify, or evaluate, the accuracy of the link between two nodes. This evaluation by other users may be accessed by a user when the user selects the linking member. As shown in the example of FIG. 12, the window associated with the linking member contains the predicate "is related to" between the two nodes, and a trustworthiness score of "2.58" out of 5 for the linking member. This information, presented to the user when the user selects the linking member, may be retrieved from the linking member data structure stored in the local database 400 (upon a request being made by the link module 160 to this effect). When the link module 160 receives the information retrieved from the linking member data structure, the information may be sent to the graph module 170. The graph module 170 may populate the window on the linking member appearing on the graphical user interface. The user may then, for instance, view the trustworthiness score of the linking member between the two nodes.

Reference is made to FIGS. 17A-17H, illustrating the progressive generating of an exemplary node navigation path in accordance with the present disclosure.

Figure 17A:
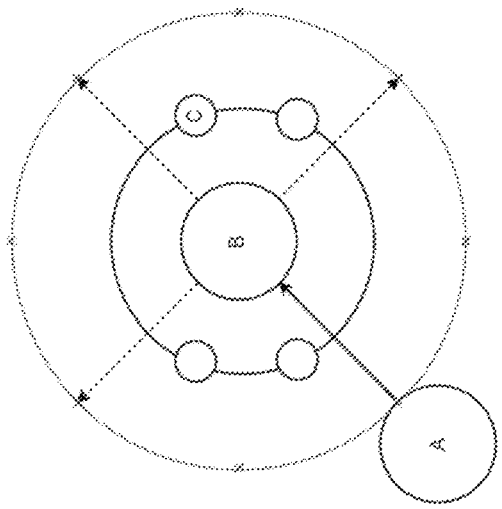
FIG. 17A is a drawing of an exemplary first search node surrounded by four peripheral nodes, and corresponds to a first stage in generating an exemplary navigation path using an exemplary navigation system.

FIG. 17A shows a first search node surrounded by four peripheral nodes.

Figure 17B:
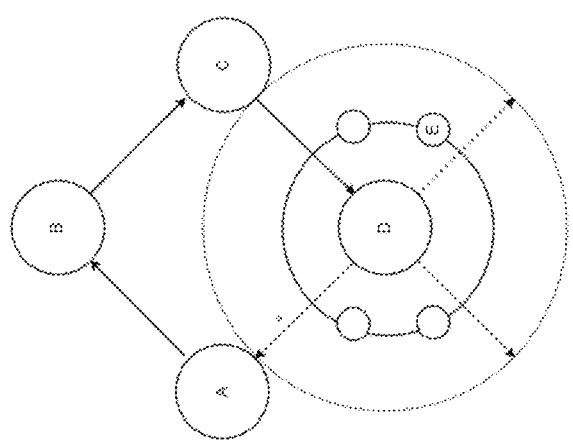
FIG. 17B is a drawing of an exemplary second stage in generating an exemplary navigation path using an exemplary navigation system.

The user selects peripheral node B, positioned in an available adjacent cell as shown in FIG. 17B. The peripheral nodes are generated around search node B. FIG. 17B shows search node A and search node B, where search node A and search node B are interconnected by a linking member.

Figure 17C:
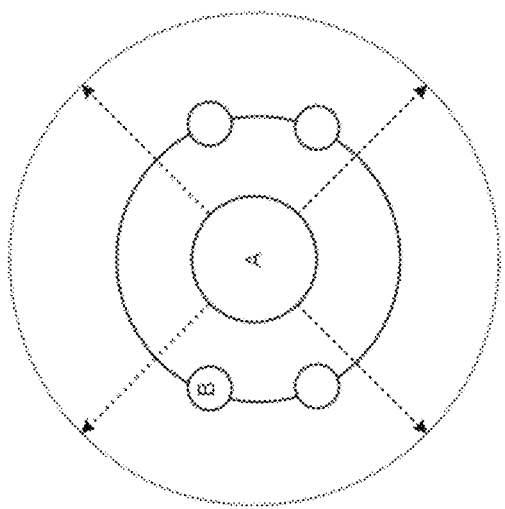
FIG. 17C is a drawing of an exemplary third stage in generating an exemplary navigation path using an exemplary navigation system.

FIG. 17C shows search node C selected from the peripheral nodes of search node B.

Figure 17D:
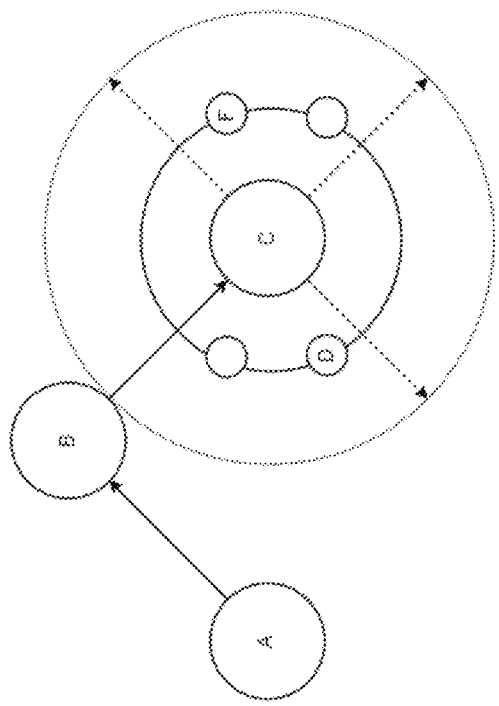
FIG. 17D is a drawing of an exemplary fourth stage in generating an exemplary navigation path using an exemplary navigation system.

FIG. 17D shows search node D selected from the peripheral nodes of search node C.

Figure 17E:
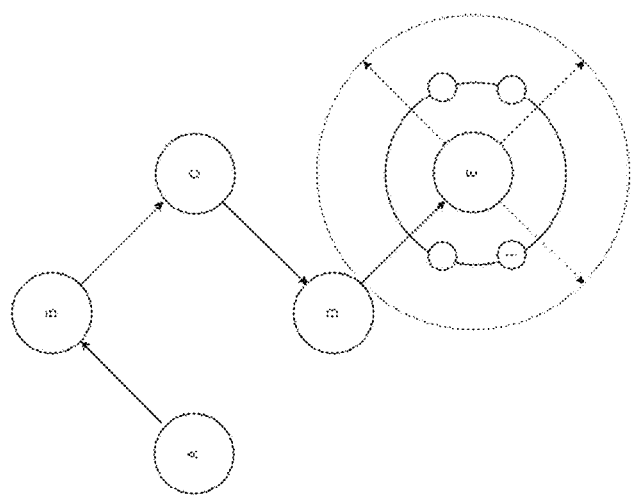
FIG. 17E is a drawing of an exemplary fifth stage in generating an exemplary navigation path using an exemplary navigation system.

FIG. 17E shows search node E selected from the peripheral nodes of search node E.

Figure 17F:
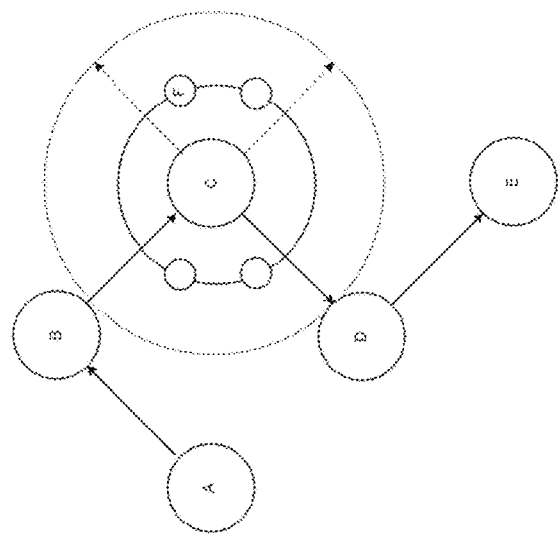
FIG. 17F is a drawing of an exemplary sixth stage in generating an exemplary navigation path using an exemplary navigation system.

FIG. 17F shows search node C, where the user may select another of the peripheral nodes of search node C (other than search node D that has already been selected by a user a search node) as a next search node.

Figure 17G:
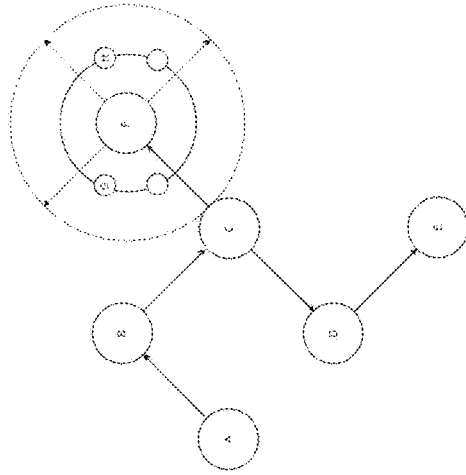
FIG. 17G is a drawing of an exemplary seventh stage in generating an exemplary navigation path using an exemplary navigation system.

FIG. 17G shows search node F selected from the peripheral nodes of search node C.

Figure 17H:
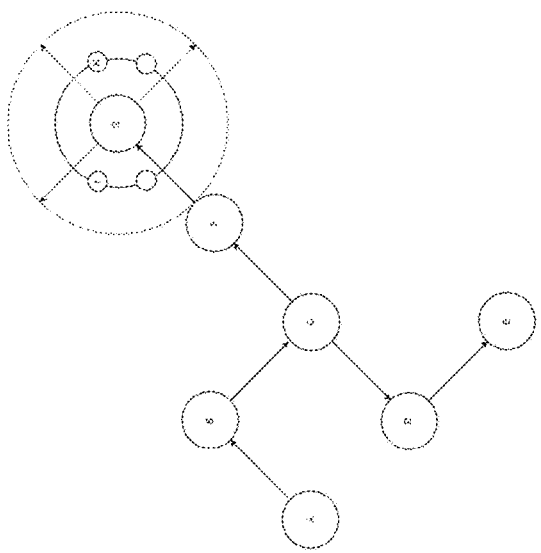
FIG. 17H is a drawing of an exemplary eighth stage in generating an exemplary navigation path using an exemplary navigation system.

FIG. 17H shows search node G selected from the peripheral nodes of search node F.

Node Data Structures and Linking Member Data Structures:

The nodes appearing on the graphical user interface are each associated with a node data structure stored in memory, e.g., the local database 400 that can be accessed by the server

200. The node data structures may be topic node data structures or user profile node data structures. The topic node data structures contain information on given topics, where the user profile node data structures contain information on specific information (e.g. information entered by a user when creating the user profile, information gathered on the user when the user is performing the navigation search using the navigation system, etc.) Therefore, the nodes appearing on the graphical user interface are depicted as associated to either a topic or a user profile.

Figure 4:
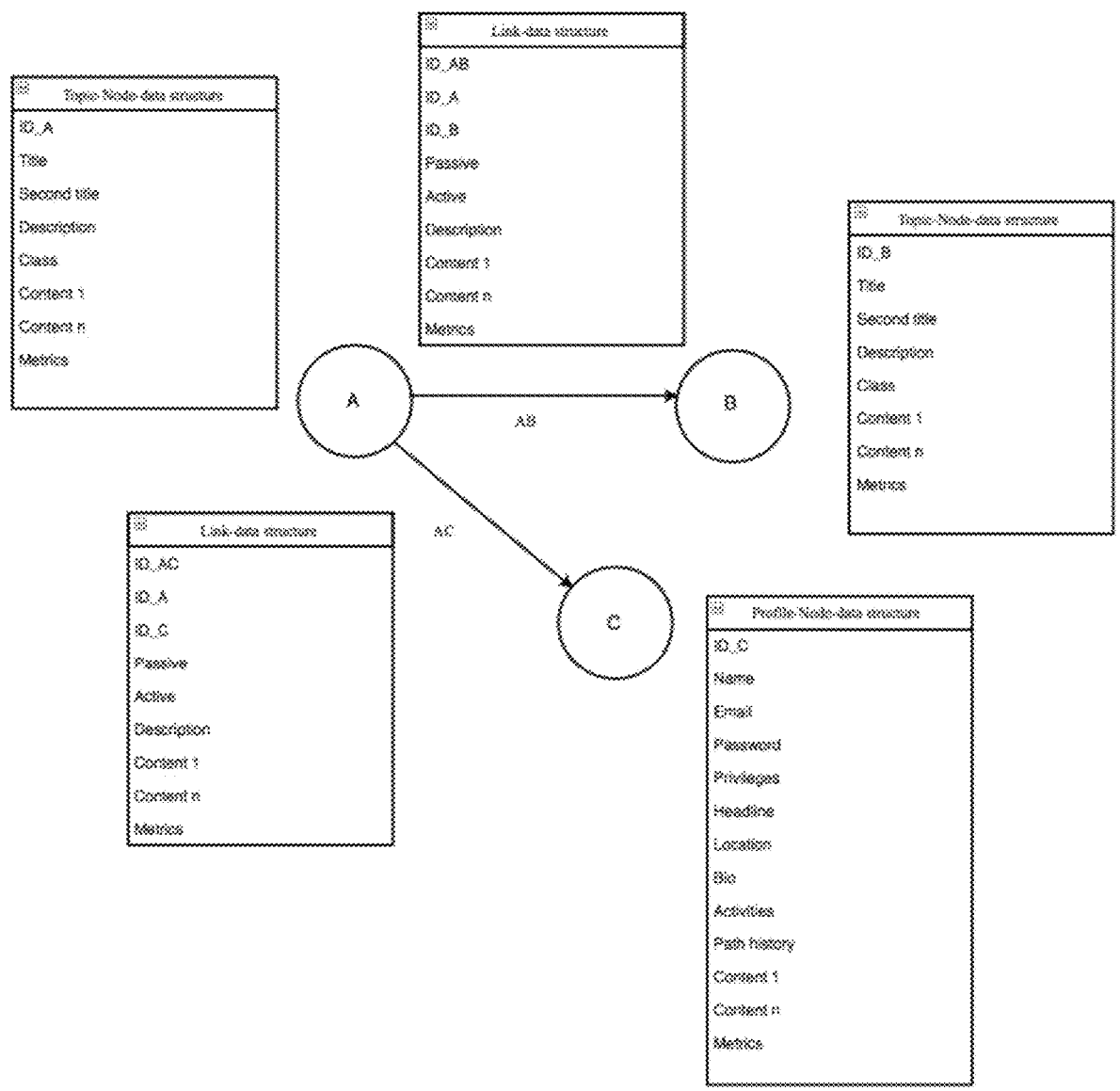
FIG. 4 is a block diagram depicting the contents of exemplary node data structures and exemplary linking member data structures.

Reference is made to FIG. 4, illustrating exemplary nodes A, B and C, where node A and node C are interconnected with exemplary linking member AC, and nodes A and B are interconnected by exemplary linking member AB.

FIG. 4 also shows exemplary contents of a node data structure and a linking member data structure stored, e.g., in local database 200, where information from the data structures can be retrieved when conducting a navigation search using the navigation system.

Node A is associated with a topic node data structure A. Exemplary topic node data structure A contains the following data, as shown in FIG. 4:
  ID_A=Unique ID of node A
  Title=Title of the node (e.g. the title of the topic)
  Second title=a second title given to the node (e.g. a synonym)—this field may remain empty in certain topic node data structures; in some topic node data structures, there may be more than two topic titles;
  Description=a string of characters providing a description on the topic, such as the description that is displayed in the window of the example of FIG. 10
  Class=true, designate this node as representing a type or category with an associated tag in the filter module; or Class=false, for any other node
  Content=pictures, links, posts, scores, other media, etc. contained in the topic node data structure. "n" means we can have n content listed where n {1, (Max rows number—rows already used)}
  Metrics=fields that are updated, for instance, by the use and/or input of the node, such as the number of visits, the number of times a user has clicked on "follow", etc.

Linking member AC is associated with the linking member data structure AC. Exemplary linking member data structure AC contains the following data, as shown in FIG. 4:
  ID_AC=Unique identifier of the linking member between node A and node C
  ID_A=Unique ID of node A
  ID_C=Unique ID of node C
  Passive means the predicate used when AC represents from object to subject (C-predicate→A)
  Active means the predicate used when AC represent from subject to object (A-predicate→C)
  Description=a string of characters providing a description on the claim expressed by the semantic triple, comprising the subject node, linking member predicate, and object node, such as the description that is displayed in the window of the example of FIG. 12;
  Content=pictures, links, posts, scores, other media, etc. contained in the linking member data structure. "n" means we can have n content listed where n {1, (Max rows number—row already used)}
  Metrics=fields that are updated, for instance, by the use and/or input of the node, such as the number of visits, the number of times a user has clicked on "follow", etc.

Node C is associated with a user profile node data structure C. Exemplary user profile node data structure C contains the following data, as shown in FIG. 4:
  ID_C=Unique ID of node C
  Name=Username (e.g. first name and last name; username selected by the user)
  Email=the user's email address (e.g. the email address of the user creating an account, entered during registration while creating the user profile)
  Password=the password entered by the user for accessing the user's account
  Privileges=the access and modification privileges held by the owner of the user account associated with the user profile
  Headline=string of characters representing, e.g., the employment or education of the user;
  Location=the location of the user as entered by the user (e.g. the city of domicile of the user)
  Biography=a string of characters providing a biography of the user;
  Activities=the actions taken by the user using the user account associated with the user profile in the navigation system (e.g. providing a trustworthiness score of a linking member; creating a new linking member between two nodes; updating the description of a topic node; etc.)
  Path history=the navigation history of the user when conducting a search using the navigation system, e.g. the search nodes selected by the user when conducting a search (the path history may be stored in the user profile node data structure such that it may be retrieved and generated on the graphical user interface of the client computing device when a user desires to pursue a previous search)
  Content=pictures, links, posts, scores, other media, etc. contained in the user profile node data structure. "n" means we can have n content listed where n {1, (Max rows number—row already used)}
  Metrics=fields that are updated, for instance, by the use and/or input of the node, such as the number of visits, the number of times a user has clicked on "follow", etc.

Node B is associated with a topic node data structure B. Exemplary topic node data structure B contains the following data, as shown in FIG. 4:
  ID_B=Unique ID of node B
  Title=Title of the node (e.g. the title of the topic)
  Second title=a second title given to the node (e.g. a synonym)—this field may remain empty in certain topic node data structures; in some topic node data structures, there may be more than two topic titles;
  Description=a string of characters providing a description on the topic, such as the description that is displayed in the window of the example of FIG. 10
  Class=true, designate this node as representing a type or category with an associated tag in the filter module; or Class=false, for any other node
  Content=pictures, links, posts, scores, other media, etc. contained in the topic node data structure. "n" means we can have n content listed where n {1, (Max rows number—row already used)}
  Metrics=fields that are updated, for instance, by the use and/or input of the node, such as the number of visits, the number of times a user has clicked on "follow", etc.

Linking member AB is associated with the linking member data structure AB. Exemplary linking member data structure AB contains the following data, as shown in FIG. 4:

ID_AB=Unique identifier of the linking member between node A and node B

ID_A=Unique ID of node A

ID_B=Unique ID of node B

Passive means the predicate used when AB represents from object to subject (B-predicate→A)

Active means the predicate used when AB represent from subject to object (A-predicate→B)

Description=a string of characters providing a description on the linking member, such as the description that is displayed in the window of the example of FIG. 12;

Content=pictures, links, posts, scores, other media, etc. contained in the linking member data structure. "n" means we can have n content listed where n {1, (Max rows number—row already used)}

Metrics=fields that are updated, for instance, by the use and/or input of the node, such as the number of visits, the number of times a user has clicked on "follow", etc.

It will be understood that the node data structures and the linking member data structures described with respect to FIG. 4 are examples. The node data structures and the linking member data structures may vary and may contain other fields of data than those presented in the examples of FIG. 4 without departing from the present teachings.

In some examples, when the server 200 determines which nodes are associated with a given peripheral node (e.g. node A) selected by a user to become a next search node, the server 200 may submit a query with the unique identifier of the peripheral node (e.g. node A) and analyze the linking member data structures to identify the linking member data structures stored in memory associated with node A. The query may be first processed to analyze the metadata of the linking member data structures to identify which field corresponds to a node identifier, then parse the string of characters or data contained in the field to determine if the string of characters or data equals the identifier of node A. If it does, the server 200 may verify that the linking member data structure corresponds to one where node A is the subject. The server 200 then retrieves from the linking member data structure the node identifier of the object node as stored in the linking member data structure. The server 200 may retrieve from memory the node data structure, or information in the node data structure corresponding to the node data structure associated with the unique identifier of the object node. The server 200 may repeat these steps to identify each of the peripheral nodes associated with the next search node (e.g. node A). The linking member information between node A and the object nodes may also be retrieved by the server 200.

Once the information on the object nodes associated with node A has been retrieved, the information is transmitted from the server 200, over the web 300, to the client computing device 100. The network interface 190 of the client computing device receives the information, transmitting same to, e.g., the search module 130. The search module 130 then communicates with the graph module 170. The graph module 170 generates the information on the graphical user interface of the display 110.

In some embodiments, where the navigation system is used in the context of scientific publications, and the external databases 500 contain publications and information on a variety of scientific topics, the "content" fields of the data structures may include links or uniform resource identifiers to publications or information stored in the external databases 500. As such, once the user has found the search node that is the focus of the user's search, the user may select the search node, and access information on the search node stored in the associated node data structure (once retrieved by the server 200). The additional information on the search node, presented, e.g., as a pop-up window, may allow the user to access external content stored in the external databases on the scientific topic, via an application program interface.

Figure 13:
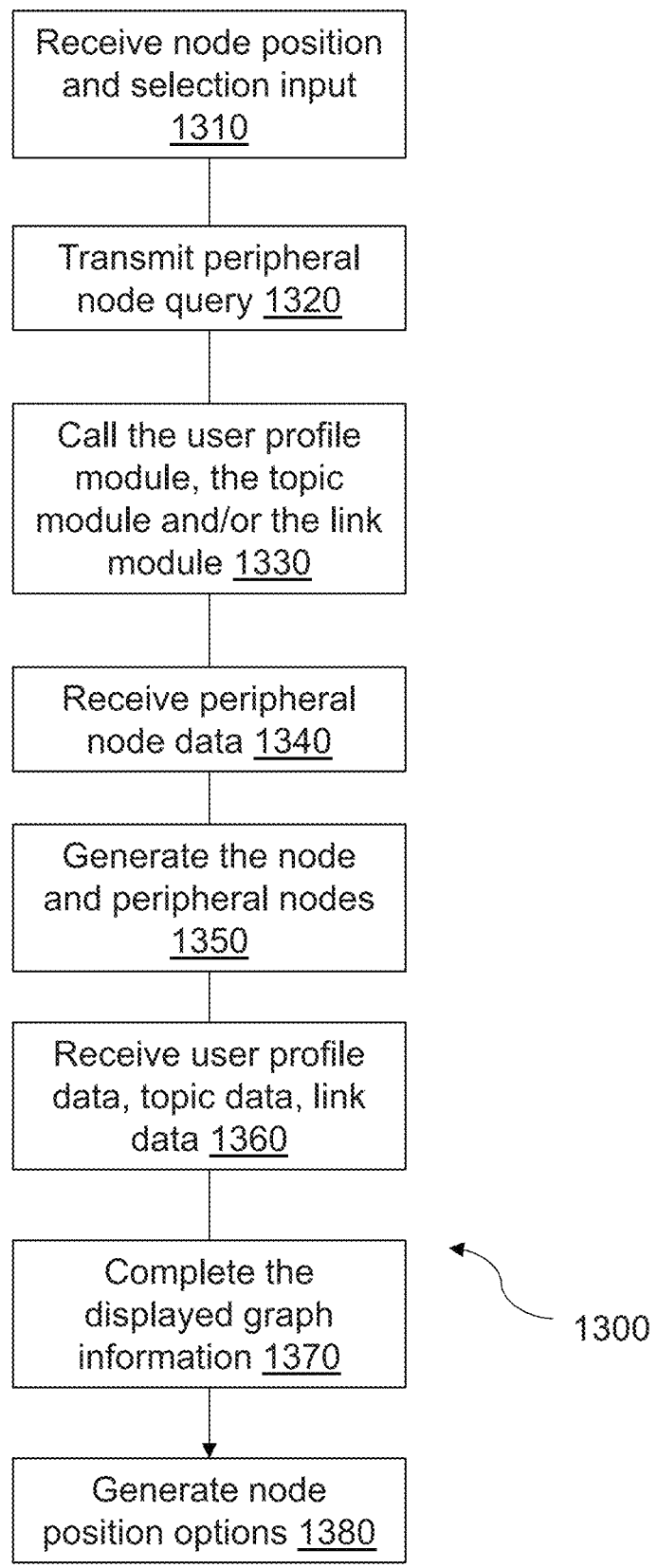
FIG. 13 is a flowchart diagram of an exemplary set of steps carried out by a graph module of the client program code stored in memory and executed by the processor of a client computing device.

Graph Module:

Reference is now made to FIG. 13, illustrating an exemplary set of steps 1300 carried out by the program code of a graph module, when executed by a processor, of an exemplary navigation system in accordance with the present teachings. For purposes of illustration, exemplary set of steps 1300 is described with respect to graph module 170.

Optionally, the graph module 170 may generate node position options for the user, the node position options corresponding to cells in which the user may position the next search node.

In some embodiments, the graphical user interface may be divided or represented as a matrix of cells with specific dimensions. In some examples, the cells may have the same dimensions. A search node may be positioned in one cell. The terminology "matrix of cells" is used herein as a representation of the graphical user interface as quantified portions of space (of equal or differing dimensions) in which search nodes can be generated. It does not necessarily mean that the graphical user interface is divided into a grid (in some examples, it may be).

The next search node may be generated in a cell that is adjacent (e.g. next to or touching) to the cell in which the current search node is positioned. The graph module 170 may also identify which of the adjacent cells are already occupied by a search node. The node position options may not include the cells that are already occupied by search nodes. The unoccupied adjacent cells may be presented by the graph module 170 as possible node position options that can be selected by the user to position the next search node.

The dividing of the graphical user interface into cells, forming a matrix of cells, helps manage the space of the graphical user interface as a user performs a search using the nodes visualizing the search selections. As a search performed through nodes can be lengthily, with multiple branches of nodes, positioning of the search nodes becomes important such that the search can be clearly visualized and personalized by the user, in such a way as to make the configuration of the nodes further organized for the user. As such, the graphical user interface is presented as a series of cells forming a matrix of cells, where the cells may be of equal dimensions, and the search nodes are positioned in unoccupied cells. In some examples, a new search node can be placed in an unoccupied cell or position that is adjacent to the previous search node, for managing the space of the graphical user interface (as shown in the path and node position options presented at FIG. 3).

It will be understood that even though the term cell and matrix are used herein, the terms cell and matrix as used herein include managing the space of the graphical user interface such that the generated search nodes can be placed in positions respecting a predefined distance and configuration, such that the positioned search nodes are at a uniform distance and have a uniform configuration with respect to one another. The term cell and matrix as used herein would include generating node position options that follow rules of uniform and consistent distance and position (where the graphical user interface is not necessarily divided into a series of cells forming a matrix, but the positioning options of the search nodes is in effect equivalent to the graphical user interface being divided into predefined cells that create a matrix of cells).

The graph module 170 receives node position input from the user at step 1310. Node position input may be, for instance, the user selecting (e.g. mouse-clicking) one cell of the node position options generated by the graph module 170. In other examples, the user may select an option to automatically position the next search node in one of the node position options, without indicating which option the user selects. The graph module 170 may then determine a node position option for placing the next search node by defaulting to predefined rules, e.g., randomly, or, for example, as a function of the priority or of the crowdedness of the surrounding cells (e.g. the number of cells surrounding each possible node position option that are occupied—the graph module 170 may, for example, position the next search node in the cells that has the least amount of adjacent occupied cells).

The graph module 170 also receives node selection input at step 1310 from the input interface 113. The node selection input may correspond to the user selecting one of the peripheral nodes surrounding the current search node.

The graph module 170 then generates a query for transmission to the server 200 (via the network interface 190) to obtain identification information of node data structures that are related to the node data structure of the selected peripheral node (that will become the next search node). The transmission may also include a query for linking member information retrievable from linking member data structures for, by having the server 200 analyze the node ID fields of the linking member data structures, identifying linking member data structures having in the node ID field the ID of the node data structure corresponding to the selected peripheral node, and the ID of one of the node data structures corresponding to the new peripheral nodes. For instance, the query may include the node identifier corresponding to the peripheral node selected by the user, where the query is tailored to retrieve identifiers of node data structures and linking member data structures associated with the peripheral node selected by the user.

In some examples, when the user also provides input to receive more information on a node or a linking member (e.g. where the graph module 170 generates a window as shown in FIGS. 10-12), the graph module 170 may call the user profile module 140, the topic module 150 and/or the link module 160 at step 1330. The user profile module 140, the topic module 150 and/or the link module 160 generates a query that is transmitted, via the network interface 190, to the server 200, to retrieve from the stored node data structures and stored linking member data structures, the information required to populate the window as a function of the user's selection (via, e.g., an application program interface or a webhook).

The graph module 170 then receives the peripheral node information from the network interface 190 (received by the server 200). The peripheral node information may include the node identification, the node title and the number of nodes (and, in some examples, the linking member information from each of the linking member data structures defined between the new search node and the peripheral nodes) that are associated to the peripheral node that has been selected by the user as a next search node. The linking member information may include the string of characters representing the predicate as stored in the linking member data structure.

Figure 5B:
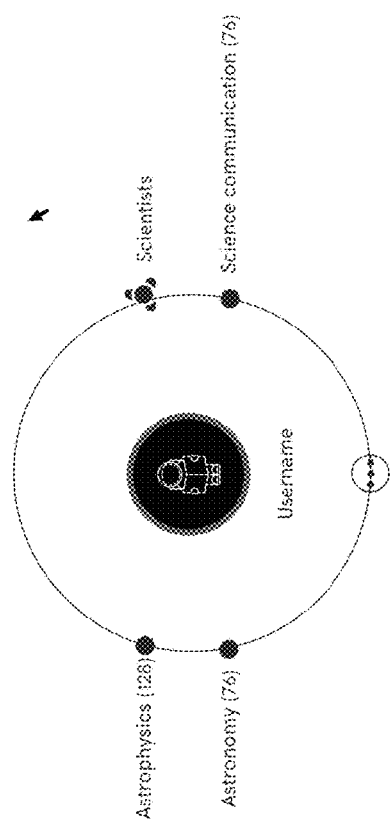
FIG. 5B is a drawing of an exemplary graphical user interface displaying a user profile node surrounded by associated peripheral nodes.

The graph module 170 generates the next search node on the graphical user interface (e.g. the graphical elements retrieved, e.g., from memory of the client computing device 100 as bitmaps) at step 1340. As shown in FIG. 8, the exemplary search node may be depicted as a circle surrounded by three lobes, with a label identifying the topic of the search node appearing in its center. It will be understood that the shape of the search node may vary (e.g. a circle; a square; a polygon; etc.) without departing from the present teachings. In some examples, a different shape may be used to distinguish topic nodes from user profile nodes, or certain topic nodes from one another. In some examples, the search node may not have a shape, represented, for instance, simply by its label. The visual representation of a topic search node may be different from the visual representation of a user profile search node. For instance, the visual representation of a user profile node may be the profile picture of the user, as shown in FIG. 5B.

The graph module 170 then generates the linking member connecting the previous search node with the new search node on the graphical user interface (e.g. the graphical elements retrieved, e.g., from memory of the client computing device 100 as bitmaps). The graph module 170 may add a visual component of directionality showing the direction of the search (e.g. from the subject node to the object node), e.g., an arrow. As shown in FIG. 8, the linking member generated by the graph module 170 is shown as a stippled line. A label indicating, for instance, the predicate, may also be generated by the graph module 170 on the graphical user interface next to the linking member. It will be understood that the appearance of the linking member may vary without departing from the present teachings (e.g. may be a solid line, may be in a specific colour, etc.) In some examples where a label of the linking member is visible on the graphical user interface, the predicates can then be added as labels to the graphical user interface by the graph module 170.

In some examples, the graph module 170 generates the peripheral nodes associated with the new search node on the graphical user interface (e.g. the graphical elements retrieved, e.g., from memory of the client computing device 100 as bitmaps) at step 1350. It will be understood that peripheral nodes are generated at step 1350 if there are nodes associated with the new search node. The quantity and labels of the peripheral nodes are determined as a function of the node data received from the server 200. For instance, if the server 200 transmits information, via the network interface 190, to the graph module 170 that there are four peripheral nodes associated with the new search node, then the graph module 170 generates four peripheral nodes. The peripheral nodes may be shown, as in FIG. 8, as circles surrounding the new search node. Even though the peripheral nodes are shown, in the example of FIG. 8, as circles surrounding the search node, the position, layout and shape (e.g. diamond; polygon; etc.) of the peripheral nodes may vary without departing from the present teachings. In some examples, the peripheral node may not have a shape, represented, for instance, simply by its label. In some examples, the visual representation of a peripheral node that is associated with a topic may be different from the visual representation of the peripheral node that is associated with a user profile (e.g. the peripheral node associated to a user profile may be the profile picture of a user).

In some examples, when the graph module 170 calls the user profile module 140, the topic module 150 and/or the link module 160 at step 1330, the user profile module 140, the topic module 150 and/or the link module 160 receives the information and transmits the information to the graph module 170. The graph module 170 receives the information from the user profile module 140, the topic module 150 and/or the link profile module 160 at step 1360. The graph module 170 may then populate the graphical user interface with the information received from the user profile module 140, the topic module 150 and/or the link module 160 at step 1370.

Optionally, in some examples, when the graph module 170 receives filter input from the filter module 120, the graph module 170 may remove from the graphical user interface the peripheral nodes that are filtered out when the filter option is applied, as selected by the user, reducing the number of peripheral nodes accordingly.

Optionally, as described above, the graph module 170 may also generate the next node position options for the next search node to be added from the peripheral nodes of the current search node. The node position options may appear on the graphical user interface such that the user may select the next node position using the input interface 113.

Optionally, when the graph module 170 generates the search node, the graph module 170 centers the graphical user interface on the newly created search node, or the search node selected by a user (e.g. using the mouse or arrow keys to identify a previous search node).

Figure 14:
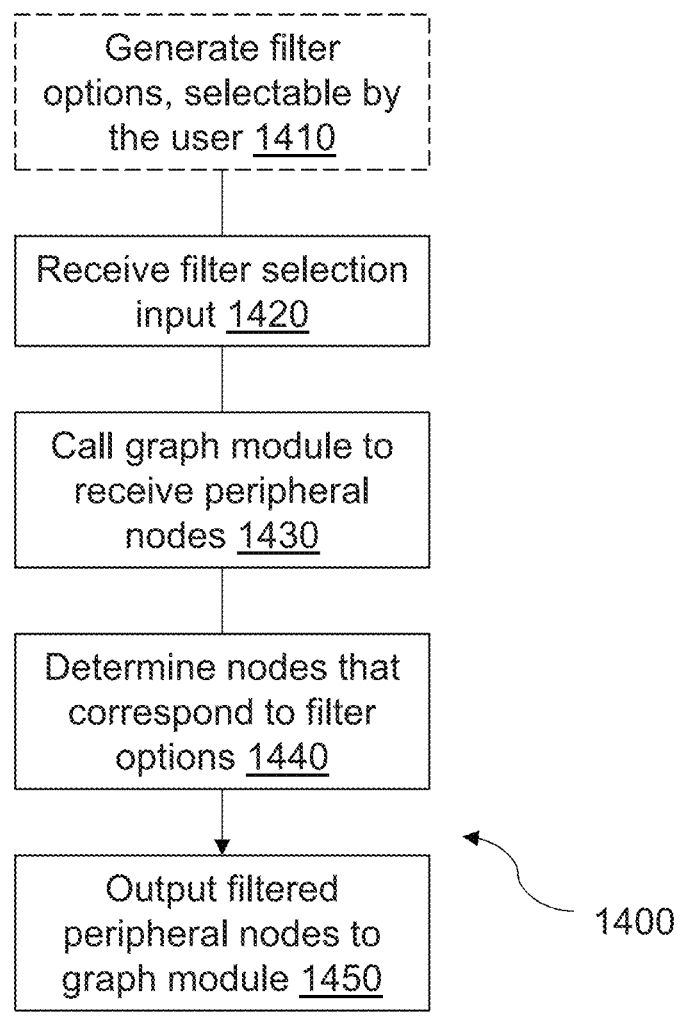
FIG. 14 is a flowchart diagram of an exemplary set of steps carried out by a filter module of the client program code stored in memory and executed by the processor of a client computing device.

The Filter Module:

Reference is now made to FIG. 14, illustrating an exemplary set of steps 1400 carried out by the program code of a filter module, when executed by a processor, of an exemplary navigation system in accordance with the present teachings. For purposes of illustration, exemplary set of steps 1400 is described with respect to filter module 120.

The filter module 120 may optionally transmit to the graph module 170 filter options to be added the graphical user interface as a function of peripheral nodes corresponding to the search node at step 1410 and/or any other set of, or the totality of, peripheral nodes corresponding to previous search nodes present on the graphical user interface. The filter module 120 may receive from the graph module 170 information corresponding to identifiers of the peripheral nodes. The filter module 120 may then send a request, transmitted via the network interface 190, to identify the labels or categories corresponding to the peripheral nodes, based on the identifiers of the peripheral nodes. The server may analyze the topic node data structures to identify the topic node data structure(s) where the field "Class" equals "True". The filter module 120 may receive from the server 200, via the network interface 190, the labels or categories corresponding to the peripheral nodes, and which peripheral nodes correspond to each of the labels or categories.

The labels or categories are transmitted as filter options by the filter module 120 to the graph module 170 (the graph module 170 adding them as filter options that can be selected by the user). The filter module 120 may also provide the graph module 170 with one or more integers corresponding to the number of peripheral nodes that are related to the label or category, the integer added by the graph module 170 to the graphical user interface. In some embodiments, the filter module 120 may then sort the labels or categories from highest to lowest, or lowest to highest.

The filter module 120 receives filter selection input provided by a user on the input interface 113 at step 1420. The filter selection input may correspond to the user selecting one of the filter options available on the graphical user interface.

The filter module 120 may call the graph module 170 to receive identifiers of the peripheral nodes associated with the search node at step 1430. In some examples, the identifiers of the peripheral nodes may be stored in the memory 111 of the client computing device 100, retrievable by the filter module 120 or the graph module 170.

The filter module 120 determines which of the peripheral nodes meets the filter option selected by the user. In some examples, when the filter module 120 generated the filter options at step 1410 in accordance with the information received from the server 200, the labels or categories, and the peripheral nodes corresponding to each label or category may be stored in the memory 111 of the client computing device 100 by the filter module 120. The filter module 120 retrieves from the memory 111 the node information corresponding to the identifiers of the peripheral nodes that correspond to the label or category associated to the filter option selected by the user. Reference is made to FIG. 9 illustrating an exemplary sidebar showing exemplary filter options.

The filter module 120 transmits the data of the peripheral node(s) (e.g. identifier of the node) corresponding to the filter option to the graph module 170 at step 1450. In other examples, the filter module 120 may instead transmit the data of the peripheral node(s) (e.g. identifier of the node) that do not correspond to the filter option to the graph module 170. The graph module 170 may then remove from the graphical user interface the nodes that do not correspond to the filter option selected by the user. The graphical user interface then may then display the nodes that correspond to the filter options.

The filter module 120 may also receive input from the user to remove the filter option. If such input is received, the filter module 120 may then transmit data to the graph module 170 such that the graph module 170 adds back the peripheral nodes that were initially removed when the filter options were applied.

Figure 15:
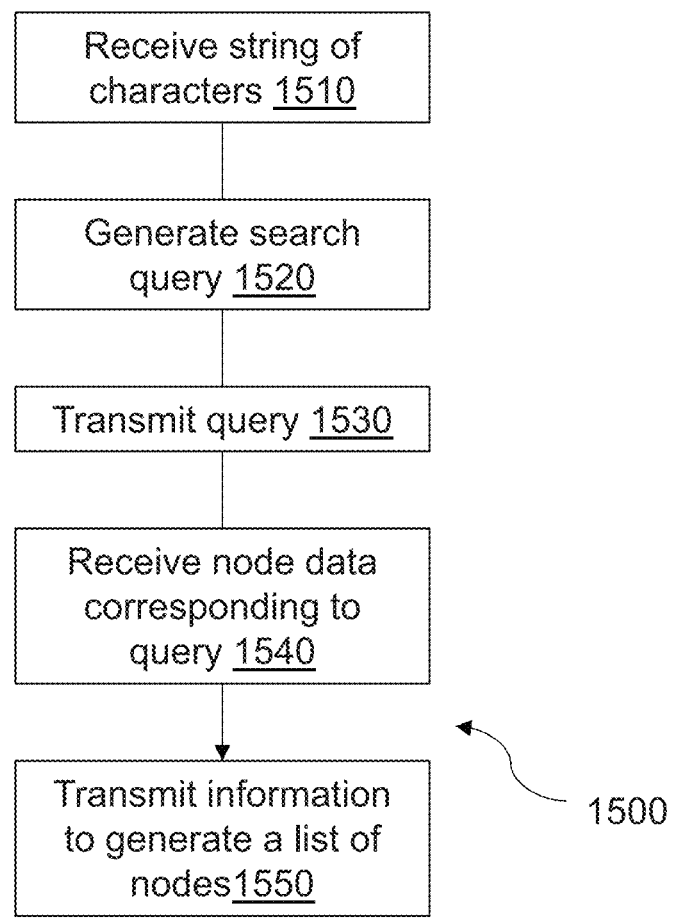
FIG. 15 is a flowchart diagram of an exemplary set of steps carried out by a search module of the client program code stored in memory and executed by the processor of a client computing device.

Search Module:

Reference is now made to FIG. 15, illustrating an exemplary set of steps 1500 carried out by the program code of a search module, when executed by a processor, of an exemplary navigation system in accordance with the present teachings. For purposes of illustration, exemplary set of steps 1500 is described with respect to search module 130.

The search module 130 receives search input (e.g. directly from the user input interface 113 or indirectly via the graph module 170) provided by a user at step 1510. Search input may be a string of characters entered by a user in a search box provided on the graphical user interface (e.g. a shown in FIG. 8).

The search module 130 generates a query as a function of the search input at step 1520, for instance, including the string of characters entered by the user.

The search node then transmits the query to the network interface 190 at step 1530. The network interface 190 transmits the query to the server 200 via the web 300. The server 200 processes the query and retrieves from, e.g., the local database 400, the information requested by the query of the search module 130 as explained herein. The server 200 may also formulate a query to obtain information from an external database 500, where the query generated by the server 200 to the external database 500 may be in the format of the external database 500 (the server 200 may include an API (an application program interface) for the database. Queried information may include, for instance, the identification of the node data structures corresponding to the queried terms, the titles of the node data structures, and the number of node data structures meeting the queried terms.

The server 200 transmits the queried information to the requesting client computing device 100.

The network interface 190 of the client computing device 100 receives the queried information and transmits the information to the search module 130.

The search module 130 receives the queried information, the node data structures that are associated with the selected peripheral node (and, in some instances, the linking members) at step 1540.

Based on the received node information, the search module 130 may generate a list of node selection options on the graphical user interface for the user that correspond to the string of characters initially entered by the user. The graph module 170 generates the node selection options on the graphical user interface. The node selection options may be generated in a side window or sidebar of the graphical user interface.

The user can then select one of the node selection options, the node selection input received by the graph module 170 to generate the first search node on the graphical user interface as explained herein.

Venn Diagram Search Nodes:

In some examples, the navigation system may provide an option for users to generate a Venn diagram search node when performing a search using the navigation system.

Figure 16A:
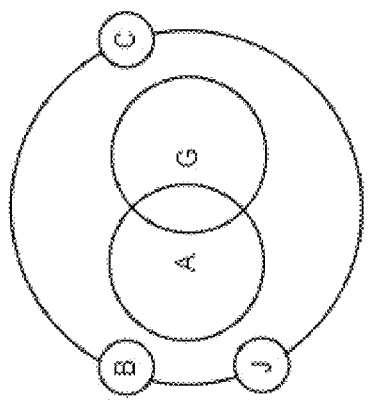
FIG. 16A is a drawing of two search nodes, and a Venn diagram search node generated from the two search nodes, displaying the peripheral nodes that are common to both initial search nodes.
Figure 16A:
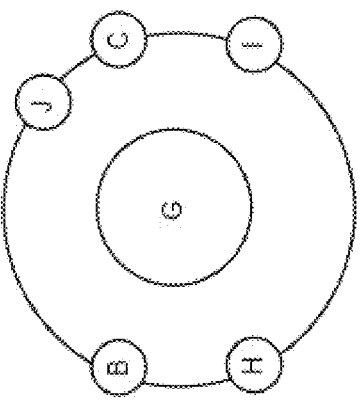
Figure 16A:
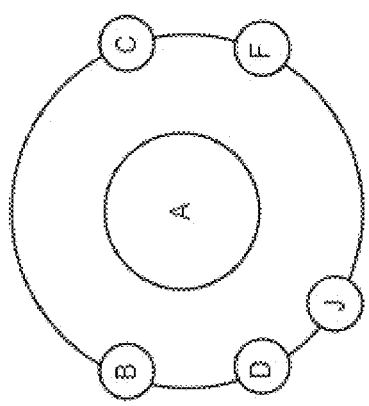
Figure 16B:
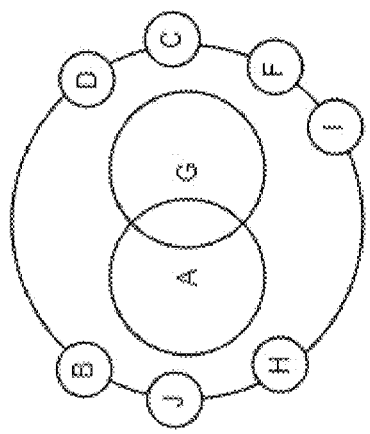
FIG. 16B is a drawing of two search nodes, and a Venn diagram search node generated from the two search nodes, displaying the peripheral nodes that are associated to either one or both of the search nodes.
Figure 16B:
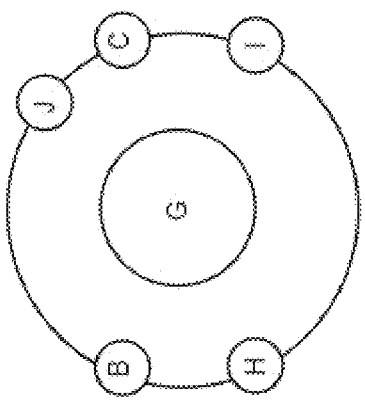
Figure 16B:
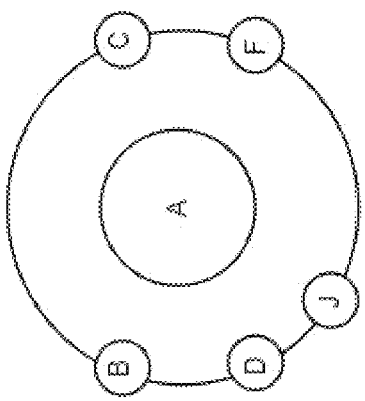

A Venn diagram search node may visually depict peripheral nodes that are common to, or for instance, disjoint from, two search nodes as shown in FIG. 16A, or nodes that may correspond to either one or both of the two search nodes as shown in FIG. 16B. A Venn diagram search node is the product of a Venn diagram search, defined as a search query, i.e., a logical operation, comprising one or more strings connected by one or more logical connectives, i.e., Boolean functions (e.g., AND, OR, XOR, EOR, EXOR, NOR, XNOR), the latter expressed either as mathematical or logical symbols, logical gates, or other equivalent operators.

This may be useful when a user is interested in conducting a search based on two initial topics, and the user would like to visually represent the related topics that are common between the two initial topics selected by a user. As a result, this may provide the user with a mechanism to accelerate a search that involves two broad topics, where the user is interested in identifying commonalities between the two broad topics. Once the Venn Diagram search node is generated, the user may pursue the search like with any other search node, by selecting a peripheral node associated with the Venn Diagram search node.

It will be understood that although the present examples show a Venn diagram node generated from two search nodes, a Venn diagram node may be generated from more than two search nodes (e.g. the peripheral nodes that are common to three search nodes, or that are associated to one, two or three search nodes).

An exemplary method of producing a Venn diagram search node is as follows.

The user may first select an icon or option on the graphical user interface for a Venn diagram search. For instance, the search module 130 may receive the input for a Venn diagram search.

The user may enter in a search bar generated on the graphical user interface a string of characters (or may select a first node from, e.g., a list of nodes). The search module 130 may generate a query to obtain a list of node selection options as a function of the input entered by the user as explained, e.g., with respect to FIG. 15, and receive node information corresponding to the user search input.

The search module 130 may then generate node selection options on the graphical user interface, selectable by the user as a function of the node information.

In the example of generating a Venn Diagram search node with peripheral nodes in common with the two selected nodes, the user may select one of the node selection options. The search module 130 may then generate a new query for the server 200 to retrieve node information on node data structures that would have at least one peripheral node in common with the node selected by the user. This may be performed by the server 200 searching through the linking member data structures stored in the local database 400 to first determine which node data structures are associated to the node data structure—which can become the peripheral nodes—of the node selected by the user. Then, the server 200 may identify which node data structures are associated to the peripheral nodes of the selected node (e.g. via the linking member data structures). The server 200 may output node information on node data structures that would share at least one peripheral node with the selected node. The server 200 may also output information on the number of peripheral nodes possessed by each of these possible node options for the Venn diagram search node. The search module 130 may then generate the node selection options for the second search node as a result of the selection of the first search node by the user. The user may then select one of the node selection options for the second search node, and execute the query to generate the Venn diagram search node on the graphical user interface.

In the example where the navigation system generates a Venn diagram search node with the peripheral nodes that are associated to at least one of the selected nodes for the Venn diagram search node, the search module 130 obtains the peripheral node information of the first node selected by the user, and the peripheral node information of the second node selected by the user (and so forth for subsequent nodes selected by the user). The search module 130 then transmits the peripheral node information to the graph module 170. The graph module 170 generates the Venn diagram search node (e.g. illustrated as two or more intersecting search nodes) with the set of peripheral nodes associated to one or more of the nodes selected by the user (the combination of the peripheral nodes associated respectively to each of the nodes selected by the user for the Venn diagram search node).

At any point in time, it will be understood that the user may provide any number of additional search node selection inputs in the search bar. The node selection input is transmitted to the graph module 170.

It will be understood that the above method is exemplary and that other methods may be performed to generate a Venn diagram search node on the graphical user interface.

Reference is now made to FIGS. 18A to 18D, illustrating an exemplary graphical user interface of an exemplary navigation system following the receiving of user input to generate a Venn Diagram search node.

Figure 18A:
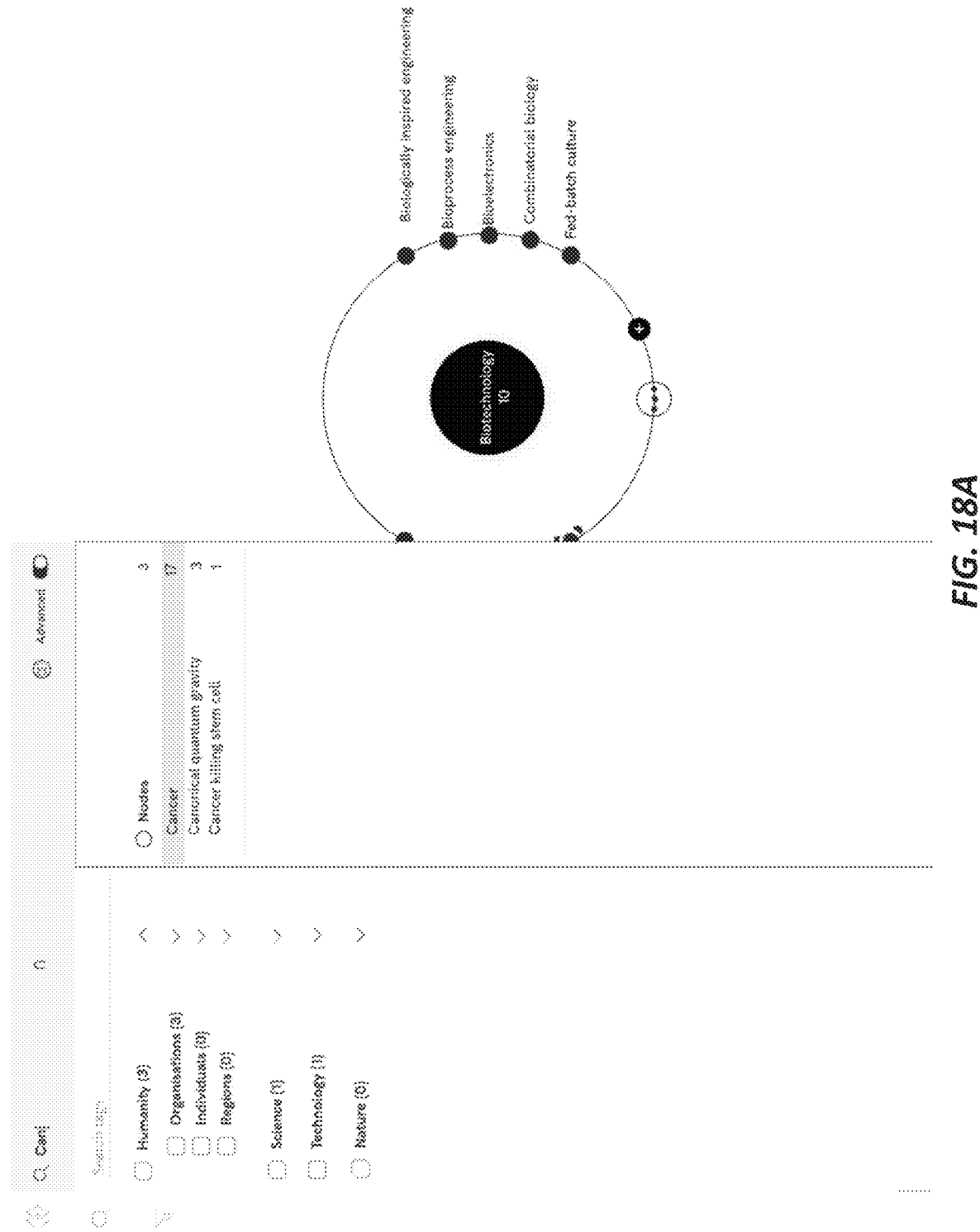
FIG. 18A is a drawing of an exemplary graphical user interface of an exemplary navigation platform illustrating input received by a user entered into a search bar to search for a first node for a Venn Diagram search, and the selecting of a first node by the user for the Venn Diagram topic search.

FIG. 18A illustrates an exemplary graphical user interface, with a search bar having a string of characters entered therein by a user. A list of node selection options for the first node of the Venn diagram search node is presented to the user as a function of the string of characters entered by the user. For instance, the user has entered the string of characters "can". The string of characters is received by the search module 130. The search module 130 generates a query that is sent to the server 200 (via the network interface 190) to identify the node data structures that correspond to the entered string of characters. For instance, the server 200 may analyse the stored node data structures to identify the field "title" for each node data structure, and verify that the "title" of the node data structure corresponds, partly or wholly, to the string of characters entered by the user, as defined by the query. The server 200 outputs and transmits back to the network interface 190, e.g., the identifiers and the titles of the node data structures corresponding to the query, and, in some examples, the number of node data structures corresponding to the query. In the example of FIG. 18A, three node data structures correspond to the query (i.e., to the string of characters "can"). The search module 130 may populate the sidebar of the graphical user interface with the labels and titles corresponding to the three node data structures corresponding to the search characters (e.g., in the example of FIG. 18A: "cancer", "canonical quantum gravity", and "cancer killing stem cell"). The user selects one of the three search selection options presented on the graphical user interface.

Figure 18B:
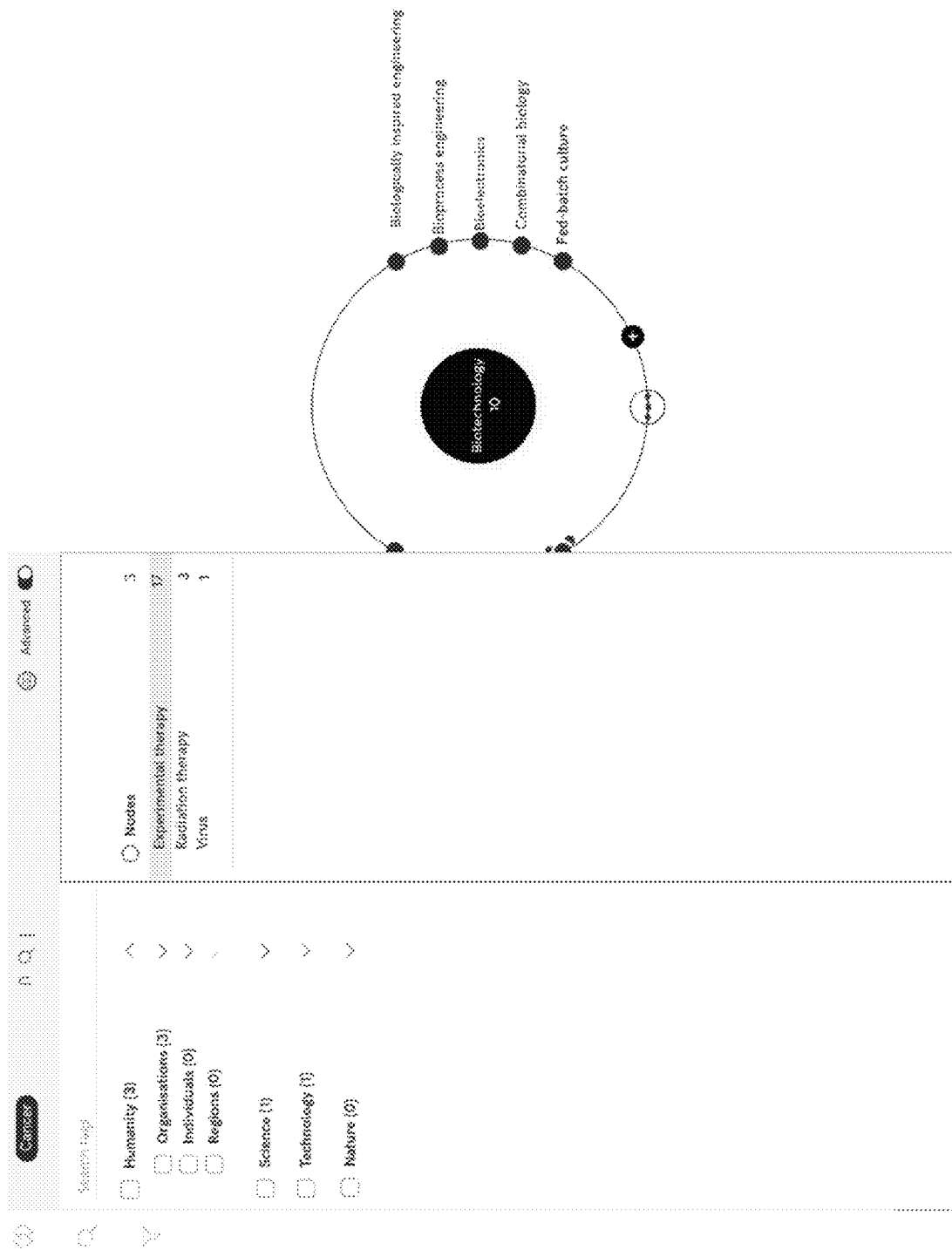
FIG. 18B is a drawing of an exemplary graphical user interface of an exemplary navigation platform illustrating the selecting of a second node from node selection options derived from the selection of the first node by the user, for generating a Venn diagram search node.
Figure 18C:
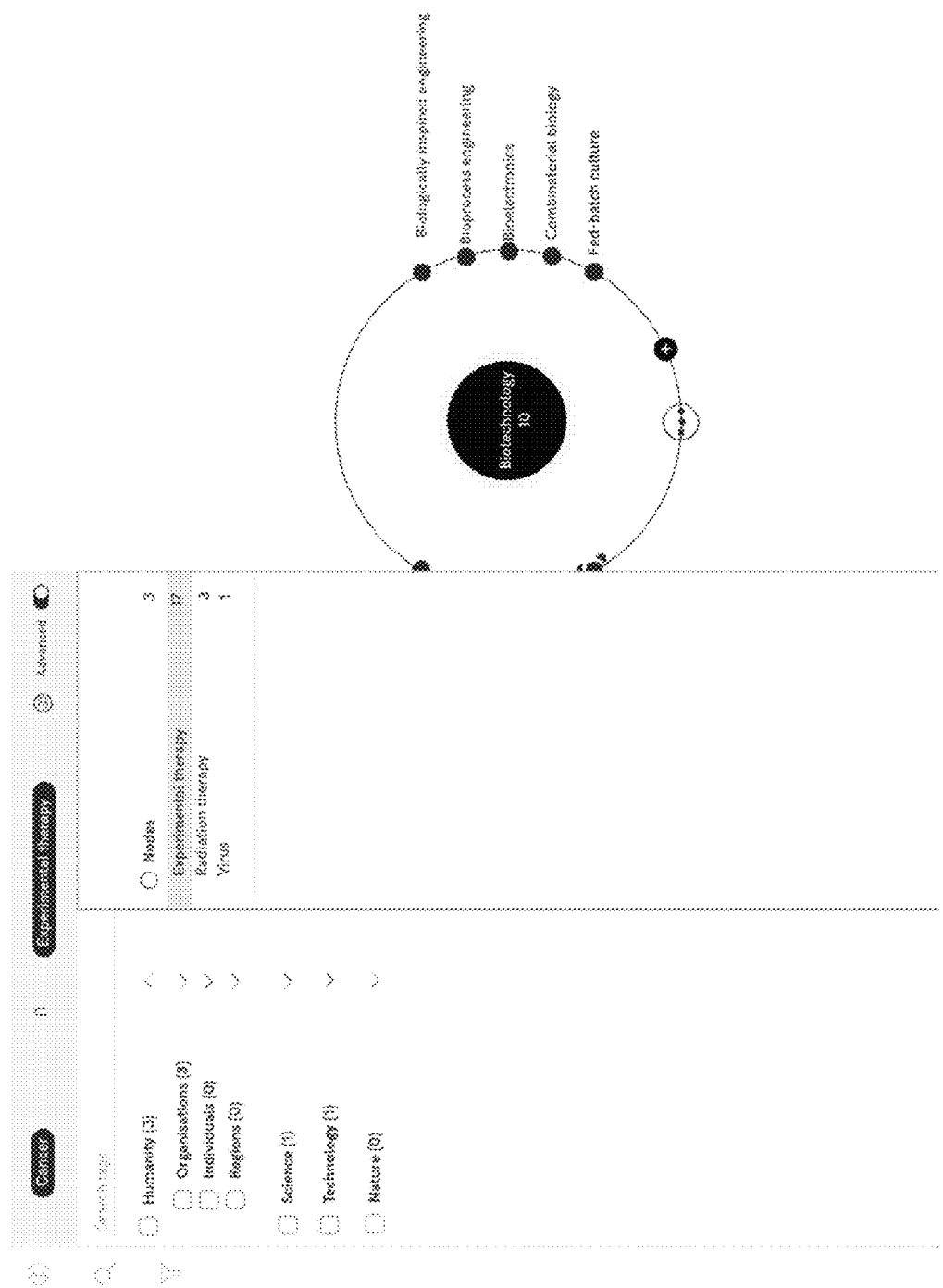
FIG. 18C is a drawing of an exemplary graphical user interface of an exemplary navigation platform illustrating both of the selected nodes for generating a Venn Diagram search node.

Following the user selecting a first search node, the search module 130 submits a second query to the server 200 (via the network interface 190) to retrieve from memory node selection options for the second node to form the Venn diagram search node, the retrieval of the node selection options performed, e.g., in accordance with the present disclosure with respect to FIGS. 16A and 16B. With reference to FIG. 18B, the user having selected "cancer" as the first node for generating the Venn diagram search node, the user is then presented with node selection options to select the second search node for the Venn diagram search.

The user selects the second node amongst the node selection options as shown in FIG. 18B. Both nodes for forming the Venn Diagram search node have been selected by the user.

Figure 18D:
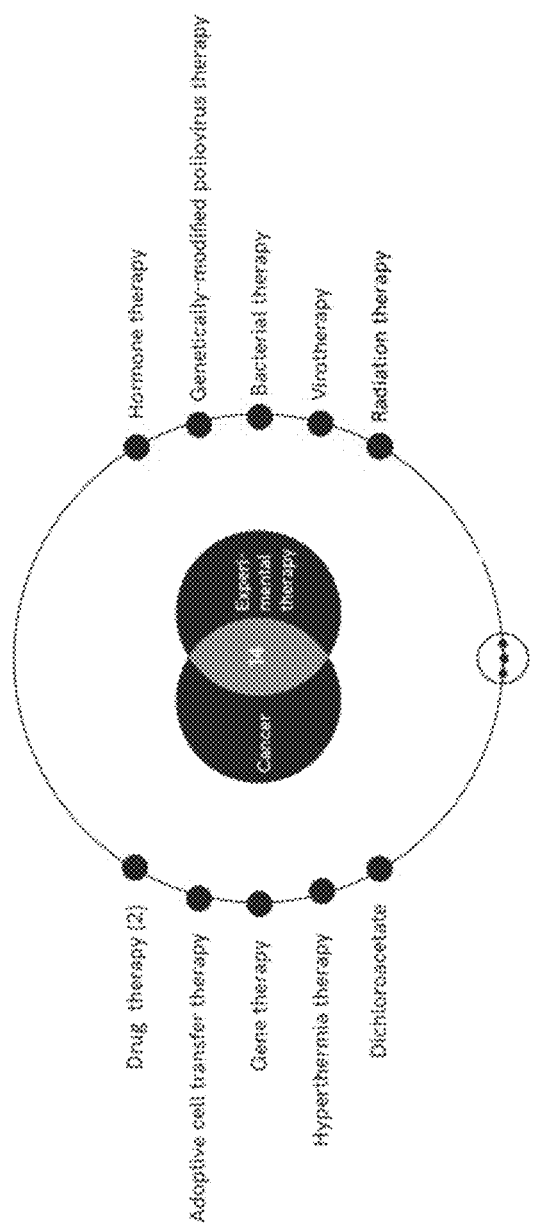
FIG. 18D is a drawing of an exemplary Venn Diagram search node generated on an exemplary graphical user interface of an exemplary navigation system, the exemplary Venn diagram search node corresponding to the nodes selected by the user in FIGS. 18A to 18C.

The graph module 170 may receive the node selection input for the two nodes that are to form the Venn Diagram search node and generates the Venn diagram search node as shown in FIG. 18D. The Venn diagram search node may be, for example, an icon represented by two intersecting circles. However, it will be understood that the Venn diagram search node may be represented by other shapes (or, in some embodiments, no shape) without departing from the present teachings. The exemplary Venn Diagram search node of FIG. 18D includes the strings of characters representing the titles of the two topics of the two selected nodes that formed the Venn Diagram search node. The exemplary Venn Diagram search node of FIG. 18D includes the peripheral nodes that are common to both the topic node "cancer" and the topic node "experimental therapy". An integer representing the number of peripheral nodes that are common to two selected topic nodes may also be included in the Venn diagram search node (as shown in FIG. 18D).

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method performed on a client computing device for providing a graphical user interface for generating a path of nodes corresponding to a search query sequence comprising:
   rendering, by the client computing device on a display of the client computing device, the graphical user interface comprising a first search node, the graphical user interface representable as a matrix of cells defined in accordance with two axes or three axes representing quantified portions of space of equal dimensions to manage allocation of space on the graphical user interface by restricting node position options to the cells, the first search node appearing in a first cell of the matrix of cells, and a first plurality of nodes associated with the first search node;
   receiving, on the graphical user interface rendered on the display of the client computing device, user input corresponding to:
     a selection of one of the first plurality of nodes to generate a second search node; and
     first node position input corresponding to selecting a second cell of a first selection of cells that are touching the first cell of the matrix of cells;
   generating, by the client computing device on the display of the client computing device, on the graphical user interface:
     a second search node corresponding to the selection of one of the first plurality of nodes in the second cell of the matrix of cells, and a second plurality of nodes associated with the second search node,
   receiving, at the client computing device:
     user input corresponding to a selection of one of the second plurality of nodes; and
     second node position input corresponding to selecting a third cell of a second selection of cells that are touching the second cell of the matrix of cells, wherein the second selection of cells excludes the first cell that is already occupied by the first search node; and
   generating, by the client computing device on the display of the client computing device, on the graphical user interface, a third search node corresponding to the selection of one of the second plurality of nodes, and a third plurality of nodes associated with the third search node, in the third cell of the matrix of cells,
   wherein a first linking member connects the first search node to the second search node, and a second linking member connects the second search node to the third search node,
   and wherein one of an additional plurality of nodes surrounding an additional search node is selected by the user, and all touching cells surrounding the additional search node are occupied by generated search nodes, a further additional search node corresponding to the selected one of an additional plurality of nodes is generated by the client computing device on the display of the client computing device, on the graphical user interface, in a cell of the touching cells of the additional search node that is occupied by one of the generated search nodes, replacing the generated search nodes.

2. The method as defined in claim 1, wherein each of the first linking member and the second linking member is associated with a linking member data structure that contains information on a predicate defining a causal or factual relationship between the first search node and the second search node, and between the second search node and the third search node respectively, and information in support of the causal or factual relationship between the first search node and the second search node, and between the second search node and the third search node respectively.

3. The method as defined in claim 2, wherein the information in support of the causal or factual relationship between the first search node and the second search node comprises a score of trustworthiness of the causal or factual relationship between the first search node and the second search node based on user input, and wherein the information in support of the causal or factual relationship between the second search node and the third search node comprises a score of trustworthiness of the causal or factual relationship between the second search node and the third search node based on user input.

4. The method as defined in claim 1, wherein the data relating to the second plurality of nodes includes an integer of a number of nodes in the second plurality of nodes, the identifier of each node data structure associated with each node of the second plurality of nodes, and a title for each node of the second plurality of nodes.

5. The method as defined in claim 1, further comprising:
rendering, on the graphical user interface generated by the client computing device on the display of the client computing device, a search bar configured to receive a string of keyboard entries inputted using a keyboard of the computing device;
transmitting, by the client computing device to one or more remote computers, data in accordance with the string of keyboard entries; and
receiving, at the client computing device, data on at least one initial node data structure that comprises compiled information on an initial topic that corresponds to the string of keyboard entries;
wherein the first search node is associated with the initial node data structure.

6. The method as defined in claim 1, wherein each of the first linking member and the second linking member includes a visual component showing search directionality from the first search node to the second search node, and from the second search node to third search node respectively.

7. The method as defined in claim 1, wherein the first search node is associated to a topic node data structure providing compiled information pertaining to an initial topic.

8. The method as defined in claim 7, wherein the compiled information includes information relating to scientific publications.

9. A computer device, comprising:
a memory to store data and instructions;
a processor in communication with the memory;
a user input interface;
a display; and
a search and navigation application program accessible via the memory and the processor, wherein the search and navigation application program is operable to:

render, on the display, the graphical user interface comprising a first search node, the graphical user interface representable as a matrix of cells defined in accordance with two axes or three axes representing quantified portions of space of equal dimensions to manage allocation of space on the graphical user interface by restricting node position options to the cells, the first search node appearing in a first cell of the matrix of cells, and a first plurality of nodes associated with the first search node;
receive, on the graphical user interface rendered on the display, user input inputted from the user input interface corresponding to:
a selection of one of the first plurality of nodes to generate a second search node; and
first node position input corresponding to selecting a second cell of a first selection of cells that are touching the first cell of the matrix of cells;
generate, on the display of the client computing device, on the graphical user interface:
a second search node corresponding to the selection of one of the first plurality of nodes in the second cell of the matrix of cells, and a second plurality of nodes associated with the second search node;
receiving, at the client computing device:
user input corresponding to a selection of one of the second plurality of nodes; and
second node position input corresponding to selecting a third cell of a second selection of cells that are touching the second cell of the matrix of cells, wherein the second selection of cells excludes the first cell that is already occupied by the first search node; and
generating, by the client computing device on the display of the client computing device, on the graphical user interface, a third search node corresponding to the selection of one of the second plurality of nodes, and a third plurality of nodes associated with the third search node, in the third cell of the matrix of cells,
wherein a first linking member connects the first search node to the second search node, and a second linking member connects the second search node to the third search node, and
wherein one of an additional plurality of nodes surrounding an additional search node is selected by the user, and all touching cells surrounding the additional search node are occupied by generated search nodes, a further additional search node corresponding to the selected one of an additional plurality of nodes is generated by the client computing device on the display of the client computing device, on the graphical user interface, in a cell of the touching cells of the additional search node that is occupied by one of the generated search nodes, replacing the generated search nodes.

10. The computer device as defined in claim 9, wherein each of the first linking member and the second linking member is associated with a linking member data structure that contains information on a predicate defining a causal or factual relationship between the first search node and the second search node, and between the second search node and the third search node respectively, and information in support of the causal or factual relationship between the first search node and the second search node, and between the second search node and the third search node respectively.

11. The computer device as defined in claim 10, wherein the information in support of the causal or factual relationship between the first search node and the second search node comprises a score of trustworthiness of the causal or factual relationship between the first search node and the second search node based on user input, and wherein the information in support of the causal or factual relationship between the second search node and the third search node comprises a score of trustworthiness of the causal or factual relationship between the second search node and the third search node based on user input.

12. The computing device as defined in claim 9, wherein the data relating to the second plurality of nodes includes an integer of a number of nodes in the second plurality of nodes, the identifier of each node data structure associated with each node of the second plurality of nodes, and a title for each node of the second plurality of nodes.

13. The computing device as defined in claim 9, wherein the user input interface comprises a keyboard, the search and navigation application program further is operable to:
   render, on the graphical user interface generated on the display, a search bar configured to receive a string of keyboard entries inputted using a keyboard of the computing device;
   transmit, to one or more remote computers, data in accordance with the string of keyboard entries; and
   receive, from the one or more remote computers, data on at least one initial node data structure that comprises compiled information on an initial topic that corresponds to the string of keyboard entries;
wherein the first search node is associated with the initial node data structure.

14. The computing device as defined in claim 9, wherein each of the first linking member and the second linking member includes a visual component showing search directionality from the first search node to the second search node, and from the second search node to third search node respectively.

15. The computing device as defined in claim 9, wherein the first search node is associated to a topic node data structure providing compiled information pertaining to the initial topic.

16. A non-transitory computer-readable medium storing instructions executable by a computer device, comprising:
   at least one instruction for causing the computing device to render, on the display, the graphical user interface comprising a first search node, the graphical user interface representable as a matrix of cells defined in accordance with two axes or three axes representing quantified portions of space of equal dimensions to manage allocation of space on the graphical user interface by restricting node position options to the cells, the first search node appearing in a first cell of the matrix of cells, and a first plurality of nodes associated with the first search node;
   at least one instruction for causing the computing device to be adapted to receive, on the graphical user interface rendered on the display of the client computing device, user input corresponding to:
      a selection of one of the first plurality of nodes to generate a second search node; and
      first node position input corresponding to selecting a second cell of a first selection of cells that are touching the first cell of the matrix of cells;
   at least one instruction for causing the computing device to generate, on the display of the client computing device, on the graphical user interface:
   a second search node corresponding to the selection of one of the first plurality of nodes in the second cell of the matrix of cells, and a second plurality of nodes associated with the second search node;
   receiving, at the client computing device:
   user input corresponding to a selection of one of the second plurality of nodes; and
   second node position input corresponding to selecting a third cell of a second selection of cells that are touching the second cell of the matrix of cells, wherein the second selection of cells excludes the first cell that is already occupied by the first search node; and
   generating, by the client computing device on the display of the client computing device, on the graphical user interface, a third search node corresponding to the selection of one of the second plurality of nodes, and a third plurality of nodes associated with the third search node, in the third cell of the matrix of cells,
      wherein a first linking member connects the first search node to the second search node, and a second linking member connects the second search node to the third search node.

17. The method as defined in claim 1, wherein the graphical user interface automatically centers on a last search node that has been generated on the graphical user interface as a function of the user input.

18. The computing device as defined in claim 9, wherein the graphical user interface automatically centers on a last search node that has been generated on the graphical user interface as a function of the user input.

* * * * *